US011541838B2

United States Patent
Navarro Arranz et al.

(10) Patent No.: US 11,541,838 B2
(45) Date of Patent: Jan. 3, 2023

(54) COVER OF AN AIRBAG FOR A VEHICLE OCCUPANT RESTRAINT SYSTEM, AND METHOD FOR PACKING AN AIRBAG IN A COVER

(71) Applicant: Dalphi Metal Espana, S.A., Vigo (ES)

(72) Inventors: Antonio Navarro Arranz, Valladolid (ES); Ramon Ramos Agustin, Viana de Cega (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 16/753,892

(22) PCT Filed: Oct. 8, 2018

(86) PCT No.: PCT/EP2018/077349
§ 371 (c)(1),
(2) Date: Apr. 6, 2020

(87) PCT Pub. No.: WO2019/076674
PCT Pub. Date: Apr. 25, 2019

(65) Prior Publication Data
US 2020/0254956 A1    Aug. 13, 2020

(30) Foreign Application Priority Data
Oct. 20, 2017  (DE) .......................... 102017124581.2

(51) Int. Cl.
*B60R 21/217*  (2011.01)
*B60R 21/215*  (2011.01)
(Continued)

(52) U.S. Cl.
CPC ........ *B60R 21/2176* (2013.01); *B60R 21/215* (2013.01); *B60R 21/235* (2013.01);
(Continued)

(58) Field of Classification Search
CPC . B60R 21/201; B60R 21/2176; B60R 21/215; B60R 21/235; B60R 21/214; B60R 2021/23509; B60R 2021/2359
See application file for complete search history.

(56) References Cited

U.S. PATENT DOCUMENTS 5,195,775 A * 3/1993 Komerska ............. B60R 21/201
280/728.2
5,364,126 A * 11/1994 Kuretake ............... B60R 21/237
102/531
(Continued)

FOREIGN PATENT DOCUMENTS

DE    102011016310    10/2012
DE    102012014599    1/2014
(Continued)

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

A flexible wrapping of an airbag (16) of a vehicle occupant restraint system (10) comprises a holding compartment for a folded airbag package (14) formed by a holding bag (104) and an airbag package fixation (124), an inflator fixation (114) formed by projecting retaining tabs (112) as well as at least one fixing portion (130) for fixing an airbag module (12) to a vehicle. For inserting the airbag package (14) into the wrapping (20) an intermediate cover made of a coherent piece of fabric is used into which the airbag package (14) is wrapped along with the inflator (18). The subassembly consisting of the intermediate cover, the airbag package (14) and the inflator (18) is inserted into the wrapping (20). Subsequently, the intermediate cover is removed from between the wrapping (20) and the airbag package (14) again.

17 Claims, 23 Drawing Sheets

(51) Int. Cl.
*B60R 21/235* (2006.01)
*B60R 21/214* (2011.01)

(52) U.S. Cl.
CPC ..... *B60R 21/214* (2013.01); *B60R 2021/2359* (2013.01); *B60R 2021/23509* (2013.01)

(56) References Cited

U.S. PATENT DOCUMENTS

| | | | | |
|---|---|---|---|---|
| 5,730,463 A * | 3/1998 | Fisher | B60R 21/207 | 280/728.1 |
| 5,755,459 A * | 5/1998 | LaLonde | B60R 21/201 | 280/728.3 |
| 5,765,867 A * | 6/1998 | French | B60R 21/16 | 280/743.1 |
| 5,884,939 A * | 3/1999 | Yamaji | B60R 21/2171 | 280/743.1 |
| 5,997,037 A * | 12/1999 | Hill | B60R 21/201 | 280/728.1 |
| 6,131,944 A * | 10/2000 | Henkel | B60R 21/16 | 280/728.3 |
| 6,145,879 A * | 11/2000 | Lowe | B60R 21/20 | 280/743.1 |
| 6,460,885 B1 * | 10/2002 | Bowser | B60R 21/231 | 280/743.1 |
| 6,588,793 B2 * | 7/2003 | Rose | B60R 21/2171 | 280/728.2 |
| 6,767,030 B2 * | 7/2004 | Yamaji | B60R 21/205 | 280/732 |
| 6,832,779 B2 * | 12/2004 | Tajima | B60R 21/231 | 280/740 |
| 6,889,999 B2 * | 5/2005 | Dominissini | B60R 21/201 | 280/730.2 |
| 6,921,121 B2 * | 7/2005 | Schneider | B60J 3/0204 | 280/730.1 |
| 6,942,242 B2 * | 9/2005 | Hawthorn | B60R 21/16 | 280/728.2 |
| 6,948,736 B2 * | 9/2005 | DePottey | B60J 3/0213 | 280/728.2 |
| 6,955,377 B2 * | 10/2005 | Cooper | B60R 21/233 | 280/743.1 |
| 6,976,705 B2 * | 12/2005 | Klaiber | B60R 21/237 | 280/730.2 |
| 7,000,945 B2 * | 2/2006 | Bakhsh | B60R 21/213 | 280/728.2 |
| 7,004,501 B2 * | 2/2006 | Schneider | B60R 21/237 | 280/743.1 |
| 7,125,037 B2 * | 10/2006 | Tallerico | B60R 21/231 | 280/728.2 |
| 7,144,035 B2 * | 12/2006 | Min | B60Q 5/003 | 280/731 |
| 7,150,470 B2 * | 12/2006 | Okada | B60R 21/205 | 280/743.1 |
| 7,234,728 B2 * | 6/2007 | Noguchi | B60R 21/232 | 280/730.2 |
| 7,314,228 B2 * | 1/2008 | Ishiguro | B60R 21/201 | 280/728.1 |
| 7,370,880 B2 * | 5/2008 | Hasebe | B60R 21/201 | 280/729 |
| 7,401,805 B2 * | 7/2008 | Coon | B60R 21/201 | 280/730.2 |
| 7,404,570 B2 * | 7/2008 | Miyata | B62J 27/00 | 280/728.2 |
| 7,404,571 B2 * | 7/2008 | Stevens | B60R 21/2171 | 280/728.2 |
| 7,441,796 B2 * | 10/2008 | Noguchi | B60R 21/232 | 280/730.2 |
| 7,445,239 B2 * | 11/2008 | Okada | B60R 21/237 | 280/743.1 |
| 7,631,894 B2 * | 12/2009 | Hasebe | B60R 21/201 | 280/743.2 |
| 7,648,157 B2 * | 1/2010 | Miwa | B60R 21/203 | 280/728.2 |
| 7,648,159 B2 * | 1/2010 | Miyata | B62J 27/00 | 280/730.1 |
| 7,712,769 B2 * | 5/2010 | Hasebe | B60R 21/231 | 280/729 |
| 7,712,781 B2 * | 5/2010 | Klinkenberger | B60R 21/231 | 280/743.1 |
| 7,753,407 B2 * | 7/2010 | Yokota | B60R 21/20 | 280/743.2 |
| 7,874,580 B2 * | 1/2011 | Wigger | B60R 21/201 | 280/732 |
| 7,878,539 B2 * | 2/2011 | Maripudi | B60R 21/23 | 280/740 |
| 7,900,958 B2 * | 3/2011 | Yamauchi | B60R 21/231 | 280/732 |
| 7,946,620 B2 * | 5/2011 | Vigeant | B60R 21/201 | 280/743.1 |
| 8,231,140 B2 * | 7/2012 | Maripudi | B60R 21/2338 | 280/740 |
| 8,276,936 B2 * | 10/2012 | Shimizu | B60R 21/216 | 280/728.3 |
| 8,297,650 B2 * | 10/2012 | Enders | B60R 21/206 | 280/730.1 |
| 8,360,464 B2 * | 1/2013 | Enders | B60R 21/206 | 280/730.1 |
| 8,407,968 B2 * | 4/2013 | Lachat | B60R 21/201 | 53/429 |
| 8,491,002 B2 * | 7/2013 | Schneider | B60R 21/215 | 280/728.3 |
| 8,500,155 B2 * | 8/2013 | Enders | B60R 21/205 | 280/728.2 |
| 8,540,276 B2 * | 9/2013 | Schneider | B60R 21/237 | 280/730.1 |
| 8,641,088 B2 * | 2/2014 | Wiik | B60R 21/213 | 280/730.2 |
| 8,651,524 B2 * | 2/2014 | Hardin | B60R 21/201 | 280/743.1 |
| 8,684,401 B2 * | 4/2014 | Shibayama | B60R 21/2334 | 280/730.2 |
| 8,746,738 B2 * | 6/2014 | Matsui | B60R 21/237 | 280/743.1 |
| 8,777,262 B2 * | 7/2014 | Enders | B60R 21/2334 | 280/743.2 |
| 8,840,141 B1 * | 9/2014 | Fischer | B60R 21/2346 | 280/743.2 |
| 9,108,589 B2 * | 8/2015 | Rickenbach | B60R 21/207 | |
| 9,387,822 B2 * | 7/2016 | Iida | B60R 21/2346 | |
| 9,440,609 B2 * | 9/2016 | Osterfeld | B60R 21/201 | |
| 9,539,974 B2 * | 1/2017 | Fukuda | B60R 21/201 | |
| 9,580,036 B2 * | 2/2017 | Choi | B60R 21/213 | |
| 9,682,678 B2 * | 6/2017 | Rose | B60R 21/201 | |
| 9,849,858 B2 * | 12/2017 | Inazumi | B60R 21/2338 | |
| 9,925,943 B2 * | 3/2018 | Ohno | B60R 21/207 | |
| 9,925,946 B2 * | 3/2018 | Webber | B60R 21/201 | |
| 9,981,625 B2 * | 5/2018 | Witt, Jr. | B60R 21/213 | |
| 10,053,042 B2 * | 8/2018 | Garcia Eireos | B60R 21/201 | |
| 10,279,767 B2 * | 5/2019 | Motomochi | B60R 21/201 | |
| 10,328,886 B2 * | 6/2019 | Peyre | B60R 21/261 | |
| 10,384,633 B2 * | 8/2019 | Warm | B60R 21/2165 | |
| 10,384,636 B2 * | 8/2019 | Shimizu | D04H 3/011 | |
| 10,471,921 B2 * | 11/2019 | Ydren | B60R 21/2176 | |
| 10,486,633 B2 * | 11/2019 | Kino | B60R 21/2165 | |
| 10,596,990 B2 * | 3/2020 | Sato | B60R 21/201 | |
| 10,696,266 B2 * | 6/2020 | Enders | B60R 21/206 | |
| 10,864,883 B2 * | 12/2020 | Yanagisawa | B60R 21/201 | |
| 2002/0084635 A1 * | 7/2002 | Tajima | B60R 21/239 | 280/732 |
| 2002/0096864 A1 * | 7/2002 | Asano | B60R 21/232 | 280/730.2 |
| 2005/0046156 A1 * | 3/2005 | Yoshikawa | B60R 21/2171 | 280/728.2 |
| 2005/0070414 A1 * | 3/2005 | Schneider | B60R 21/237 | 493/405 |
| 2006/0071458 A1 | 4/2006 | Sendelbach et al. | | |
| 2007/0085305 A1 | 4/2007 | Feller et al. | | |
| 2007/0284858 A1 * | 12/2007 | Nishimura | B60R 21/217 | 280/729 |

(56) References Cited

U.S. PATENT DOCUMENTS

| | | | |
|---|---|---|---|
| 2008/0217892 A1* | 9/2008 | Maripudi | B60R 21/201 |
| | | | 280/740 |
| 2009/0102166 A1* | 4/2009 | Brown | B60R 21/201 |
| | | | 280/728.2 |
| 2009/0152842 A1* | 6/2009 | Benny | B60R 21/2338 |
| | | | 280/728.3 |
| 2010/0207367 A1 | 8/2010 | Weyrich et al. | |
| 2017/0043738 A1* | 2/2017 | Peyre | B60R 21/214 |
| 2017/0120853 A1* | 5/2017 | Rose | B60R 21/215 |
| 2017/0297525 A1 | 10/2017 | Debler et al. | |
| 2019/0256033 A1* | 8/2019 | Schmid | B60R 21/237 |
| 2020/0180541 A1* | 6/2020 | Abelenda Alcalde | |
| | | | B60R 21/201 |
| 2020/0254955 A1* | 8/2020 | Navarro Arranz | B60R 21/237 |
| 2020/0254959 A1* | 8/2020 | Navarro Arranz | B60R 21/214 |
| 2020/0276954 A1* | 9/2020 | Navarro Arranz | B60R 21/214 |

FOREIGN PATENT DOCUMENTS

| | | |
|---|---|---|
| EP | 1514745 | 2/2006 |
| WO | 2008138588 | 11/2008 |

\* cited by examiner

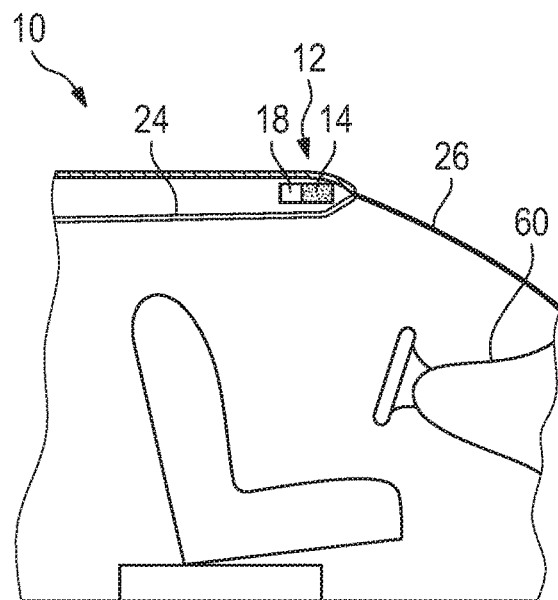
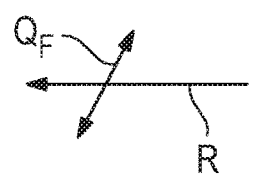
Fig. 10
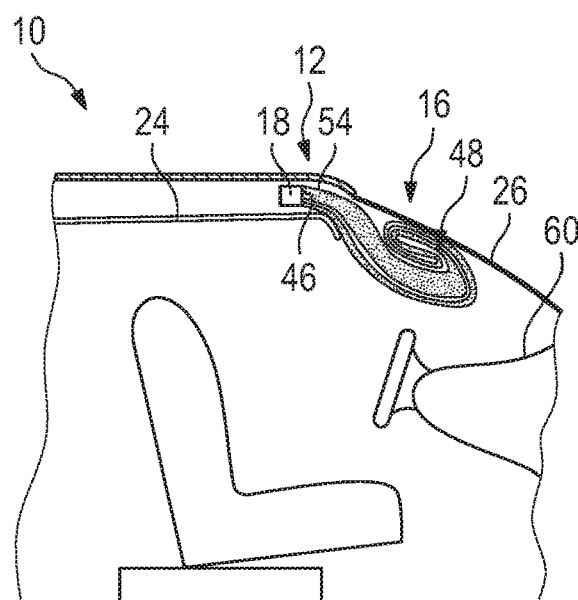
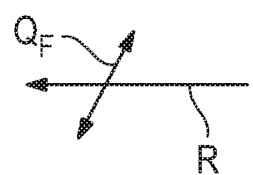
Fig. 11

COVER OF AN AIRBAG FOR A VEHICLE OCCUPANT RESTRAINT SYSTEM, AND METHOD FOR PACKING AN AIRBAG IN A COVER

RELATED APPLICATIONS

This application corresponds to PCT/EP2018/077349, filed Oct. 8, 2018, which claims the benefit of German Application No. 10 2017 124 581.2, filed Oct. 20, 2017, the subject matter of which are incorporated herein by reference in their entirety.

BACKGROUND OF THE INVENTION

The invention relates to a wrapping of an airbag of a vehicle occupant restraint system and a method of packing an airbag in a wrapping.

For protecting the vehicle occupants, with great success airbags have been employed. Prior to deployment within the vehicle interior, said airbags have to remain protected against environmental influences. In order to save weight and construction volume, endeavors have been made to replace rigid modular casings by wrappings made from airbag fabric or film.

SUMMARY OF THE INVENTION

It is the object of the invention to facilitate the insertion of a folded airbag into a wrapping and the fixation of an airbag module inside the vehicle by providing a new wrapping as well as a method of packing the airbag.

This object is achieved by a wrapping comprising the features of claim 1. The flexible wrapping of an airbag of a vehicle occupant restraint system includes a holding compartment for a folded airbag package formed by a holding bag. Moreover, the wrapping includes an airbag package fixation, an inflator fixation formed by projecting retaining tabs as well as at least one fixing portion for fixing an airbag module to a vehicle. The folded airbag package can be easily introduced to the wrapping by inserting the same into the holding bag. The airbag package fixation helps hold the airbag package safely in the folded state inside the holding bag. The inflator fixation permits, on the one hand, to fasten the wrapping to the inflator and, one the other hand, to maintain a folded neck connected to the inflation end of the airbag in position, where necessary. The fixing portion enables the entire airbag module including the folded airbag and the wrapping to be easily fixed to a vehicle. According to the invention, all essential aspects of fixing an airbag package, an inflator and the airbag module to the vehicle can be configured on the wrapping, which facilitates handling and reduces the number of the individual components used.

Preferably, the wrapping is completely manufactured from airbag fabric. This facilitates simple and low-cost manufacture and saves weight and constructed space. When portions of the wrapping are to be joined by sewing, additionally seam material may be used, of course. Also, a connection by welding or gluing is imaginable, however.

The wrapping according to the invention is especially suited for an airbag module which is disposed at the roof rail beneath a roof liner on the passenger side so as to provide protection for the passenger.

For reducing the number of the individual cut parts of the wrapping, the retaining tabs may merge into the holding bag in one piece, namely preferably at the edges which are opposed to a bottom of the holding bag.

The airbag package fixation can be easily formed at the wrapping by providing at least one meshing pair of first and second fixing elements which form a connector pair, especially in the form of a hook and an eye. The hook preferably takes the shape of an arrow point including two lateral undercuts adapted to engage behind the edges of the eye.

Both the first and second fixing elements are preferably completely formed of the material of the wrapping, viz. especially of airbag fabric. It has turned out that a simple nesting of the fixing elements is sufficient to retain the airbag package on the wrapping without any additional Velcro, gluing or welding connection being required.

Preferably, two pairs of first and second fixing elements are provided which may be juxtaposed in a direction in parallel to the bottom of the holding bag.

The fixing elements are used, for example, for maintaining a belt portion of the airbag package fixation in position which fixes the airbag package within the holding bag.

Of preference, the airbag package comprises a main package in which a restraint part of the airbag is folded which makes up for the major part of the volume of the airbag, as well as a connecting portion in which only the neck of the airbag is folded. The neck is significantly narrower preferably in parallel to the bottom direction and transversely to a longitudinal module direction and is shorter than the restraint portion along the longitudinal module direction so that the connecting portion is shorter and narrower than the main package.

The belt portion extends especially on the outside over an opening of the holding bag so that it may be adjacent to the edges of the airbag package, preferably of the main package, and maintains the airbag package within the holding bag.

The belt portion may be merged into the holding bag in one piece, especially at the edge of the holding bag which is opposed to the bottom. In this way, the belt portion can form a portion of the first cut part.

For example, there may be provided two belt portions forming lateral legs of a U-shaped bracket which is formed especially by a U-shaped intersecting line separating the bracket from one of the retaining tabs. The intersecting line can be easily introduced to a flatly spread cut part.

The second fixing elements, i.e. the eyes, are preferably formed in a web portion of the bracket connecting two lateral belt portions, i.e. in a central web of the "U".

The wrapping preferably consists of two interconnected separate cut parts. Accordingly, the inflator fixation may be formed in the first cut part, just as the holding bag, and the fixing portions may be formed in the second cut part. The airbag package fixation, on the other hand, is preferably realized by portions of both cut parts.

Advantageously, the first fixing elements, viz. the hooks, are part of a second cut part and are cut out of a multi-layer portion so as to obtain sufficient stiffness. The second fixing elements, viz. the eyes, are preferably configured in the single-layer first cut part, however.

The second cut part extends especially over the first cut part being folded once and forming the holding bag, for example in parallel to the longitudinal extension of the bottom of the holding bag. The at least one first fixing element is formed in the second cut part, while the at least one second fixing element is formed in the first cut part.

The entire cutting of both cut parts of the wrapping may be performed by laser cutting.

Preferably, the wrapping consists in portions, and especially the second cut part completely, of plural layers of airbag fabric. The edges of the respective portion are produced by laser cutting, with the plural layers being welded to each other at the edges. Welding is carried out directly by the laser cutting so that any further finishing and fixing of the individual layers of airbag fabric to each other may be omitted.

The entire first cut part, on the other hand, is preferably made from single-layer material.

The holding bag, the retaining tabs and the bracket may be completely part of the first cut part. The holding bag and the retaining tabs can be realized by folding the first cut part back onto itself, with the longitudinal edges adjacent to the folding line being connected in portions so as to form the holding bag. The free portions then form the retaining tabs. In order to form the bracket, the U-shaped intersecting line may be introduced to the first cut part so that it separates one of the retaining tabs radially inside the intersecting line, while between the intersecting line and an outer edge of the first cut part the bracket is formed.

The bottom of the holding bag preferably includes a weakened zone opening upon deployment of the airbag so that the airbag may exit the wrapping. For example, a perforation may be introduced to the material of the wrapping.

The inflator fixation can be easily fastened on the inflator, as each retaining tab of the inflator fixation includes at least one fastening hole for a fastening bolt of the inflator.

Preferably, a positioning bolt is provided at the inflator and a positioning hole correlated with the arrangement of the positioning bolt is provided in each of the retaining tabs. In this way, protection against faulty assembly during insertion of the airbag package including the mounted inflator into the wrapping is provided in accordance with the Poka-Yoke principle.

When viewed from the bottom of the holding bag, the two retaining tabs may have different lengths. In this way, by differently acting distances the orientation of the inflator about the longitudinal axis may be influenced, for example for disposing the latter linearly inside the wrapping so that the fastening bolts point along the longitudinal module direction. In general, the rotation of the inflator inside the finished airbag module can be influenced via the length of the two retaining tabs.

Preferably, on both sides of the wrapping a respective fixing portion especially comprising at least one fastening hole and a prefixing hole is formed.

The two fixing portions are advantageously part of the second cut part and project especially laterally from the holding bag so as to allow for easy assembly of the airbag module to the vehicle.

The fixing portion may include a fastening hole, for example, through which a load-bearing screwed connection is closed as well as especially in addition a prefixing hole enabling the fixing portion to be prefixed to the vehicle, for instance via a fastening clip. After prefixation on the vehicle, then the permanent load-bearing screwed connection to the vehicle frame may be added.

Of advantage, the fastening clips are inserted in the prefixing holes already before assembling the airbag module to the vehicle.

When deploying the airbag, preferably the airbag package fixation remains closed, just as the inflator fixation, and the fixing portion remains fixed to the vehicle. Thus, the once closed fixations at the wrapping will not be opened when the airbag deploys.

The afore-stated object is further achieved by a method of packing an airbag in a wrapping comprising the steps listed in claim 17. In the method of packing an airbag in a wrapping, an airbag folded into an airbag package including an inflator is provided, just as an intermediate cover consisting of a coherent, especially rectangular piece of fabric whose length corresponds to a total circumference of the airbag package and which includes holes for fastening to the inflator at both longitudinal ends.

The airbag package is wrapped together with the inflator into the intermediate cover so that the intermediate cover surrounds the airbag package and the inflator in the longitudinal module direction. The two longitudinal ends of the intermediate cover are fastened to the inflator.

The subassembly consisting of the intermediate cover, the airbag package and the inflator is inserted into the wrapping so that the airbag package is located in portions, especially with the main package, in the mount of the wrapping.

The intermediate cover is opened by detaching both longitudinal ends of the intermediate cover from the inflator.

Either of the retaining tabs of the inflator fastening of the wrapping is fastened to the inflator.

The intermediate cover then is removed from between the airbag package and the wrapping and the second retaining tab of the wrapping is fastened to the inflator so as to close the wrapping.

The wrapping or the intermediate cover may always be fastened to the inflator by pulling the respective holes over the fastening bolts (and the positioning bolt) of the inflator. Gluing, welding, sewing or the like is not required.

The intermediate cover is completely removed from the subassembly again and may be re-used unchanged.

After closing the inflator fixation, in another step preferably the airbag package fixation is closed. Since the wrapping is already fastened to the inflator and thus to the airbag package via the retaining tabs, the airbag package is held in its form and position already by the wrapping so that the airbag package fixation now can be easily closed in a positionally accurate manner.

In general, the inflator is disposed in the airbag module so that its longitudinal axis is perpendicular to the longitudinal module direction of the airbag module, wherein the longitudinal module direction in the mounted state of the airbag module coincides with a deployment direction of the airbag out of the airbag module and approximately points in the longitudinal vehicle direction.

In a possible configuration of the invention, the vehicle occupant restraint system comprises an airbag module including a wrapping according to the invention as module casing. The airbag module is mounted in the area of the roof liner of the vehicle on the passenger side, when viewed in the transverse vehicle direction, approximately centrally relative to the passenger seat and includes an airbag folded into an airbag package which in the case of restraint will deploy between the windshield and the passenger so as to frontally absorb the passenger. The airbag package retained in the wrapping is disposed between the pivot axis of the sun visor and the windshield of the vehicle.

The airbag package comprises a main package and a connecting portion that connects the main package to the inflator, wherein the main package and the connecting portion constitute two separately folded portions.

The inflator is inserted directly into the inflation end of the airbag and is tightly connected to the airbag, as the two opposite tabs of the airbag with fastening holes formed therein are pulled over fastening bolts projecting from the inflator, as explained, and in this way seal the inflation opening in a gastight manner.

For fastening the airbag module to the roof rail, the inflator is accommodated in a mount C-shaped in cross-section of a module carrier mounted on the roof rail, wherein the arm of the C-shaped mount on the vehicle interior side does not substantially project from the inflator, however.

In the case of restraint, the inflator is activated and filling gas flows at first into the connecting portion in which a neck of the airbag is folded in a mere zigzag folding. This causes the neck to stretch, and by the resulting increase in volume the still at least largely folded main package in which a restraint part of the airbag comprising a major part of the airbag volume is folded is moved from beneath the roof lining into the vehicle interior. The inflator, the connecting portion and the main package are located on a straight line along the longitudinal module direction.

While the restraint part of the airbag unfolds out of the main package, initially a first free end of the airbag can still be withheld by a tether connecting the first free end to the inflator.

The main package is folded e.g. so that the first free end is folded back to the inflation end. Moreover, the two lateral portions of the restraint part are folded back to the center and are subsequently rolled up. In this way it is achieved that first an outer leg of the airbag is filled which extends from the inflation end to a second free end of the airbag which in the inflated state is located approximately in the transition from the windshield to the instrument panel. On the other hand, for the time being the filling gas substantially does not yet flow into an inner leg of the airbag which extends from the inflation end to the first free end of the airbag. This is obtained by the folding of the restraint part of the airbag and by the tether.

From a particular fill level that is reached after a predetermined first period following the activation of the inflator, the tether becomes detached due to the tensile forces acting and also the inner leg of the airbag and the first free end of the airbag are completely inflated.

In the completely inflated state of the airbag, the first free end extends beyond the instrument panel in the direction of the vehicle occupant, and a baffle is formed between the first free end and the inflator-side inflation end of the airbag on the side facing the vehicle occupant.

The airbag is substantially composed of three outer wall portions of which a first outer wall portion extends from the inflation end to the second free end and forms a bearing surface for bearing against the windshield. The second outer wall portion connects the first free end to the second free end and, in the inflated state, rests on and above the instrument panel, and the third outer wall portion connects the first free end to the inflation end and, in the inflated state, forms the baffle.

All features described in connection with the invention can also individually be realized independently of each other or in any suitable combinations being at the discretion of those skilled in the art.

BRIEF DESCRIPTION OF THE DRAWINGS

Hereinafter, the invention shall be described in detail by way of an embodiment with reference to the enclosed Figures, wherein:

FIGS. 10 to 17 show the inflating operation of the airbag of the airbag module of FIG. 1 from the state prior to activation of the vehicle occupant restraint system to the completely inflated airbag in a schematic sectional view;

DESCRIPTION

Figure 1:
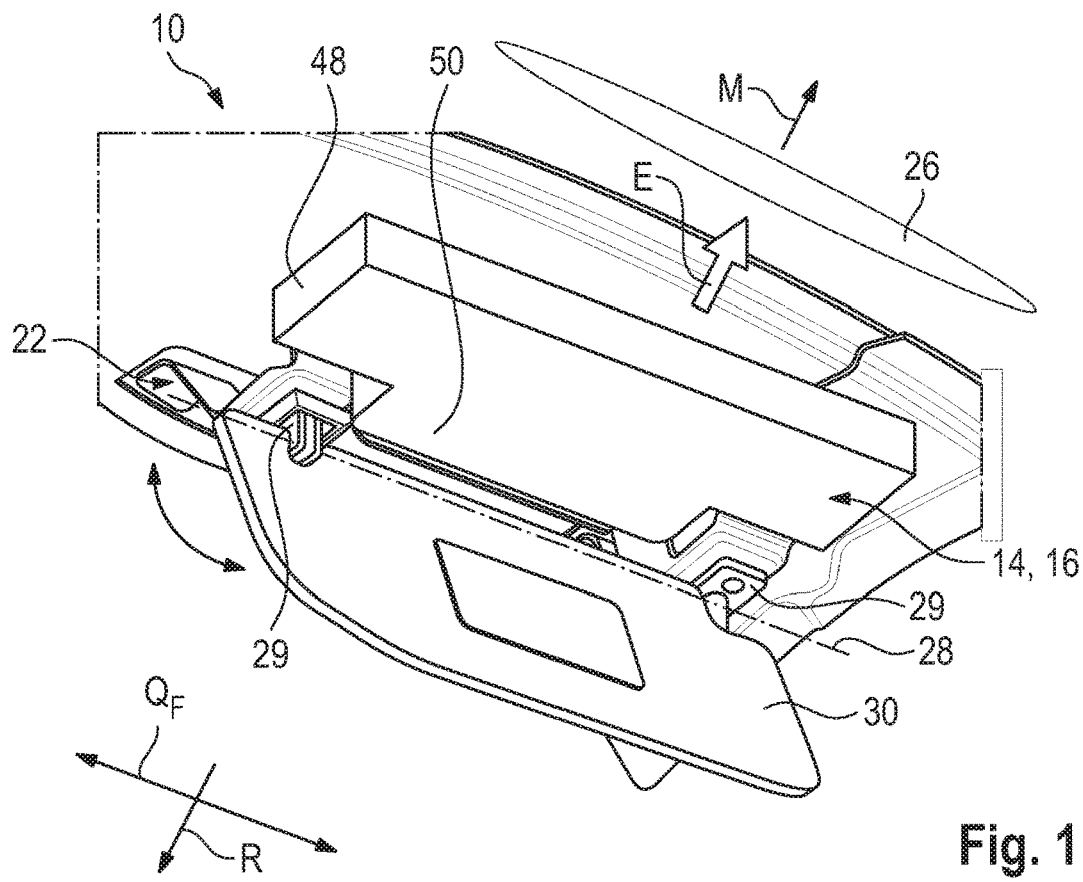
FIG. 1 shows a schematic perspective view of a vehicle occupant restraint system according to the invention comprising an airbag module mounted on a roof of the vehicle.
Figure 2:
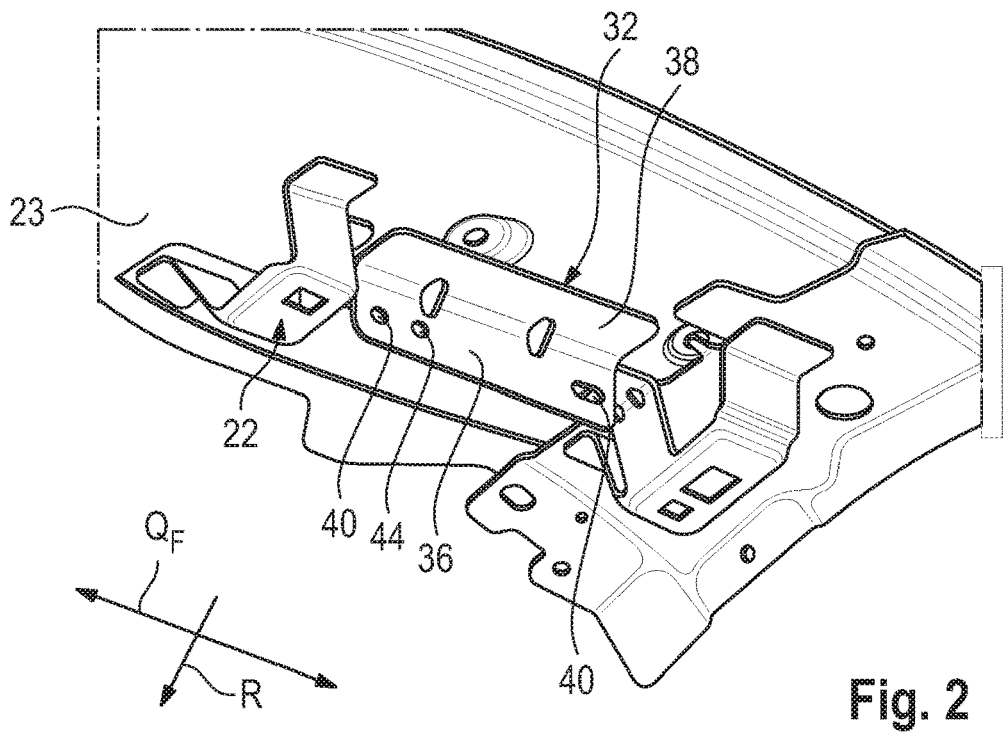
FIG. 2 shows a module carrier of the airbag module of FIG. 1 mounted on the vehicle roof.
Figure 3:
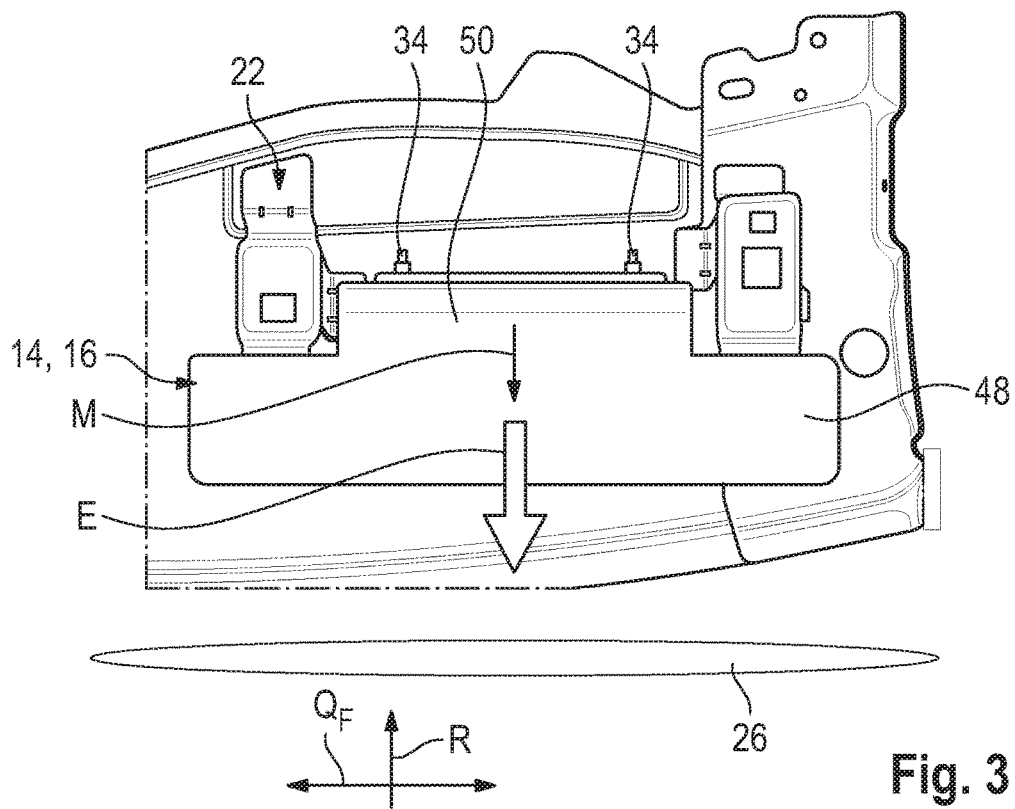
FIG. 3 shows a top view onto the airbag module of FIG. 1.
Figure 4:
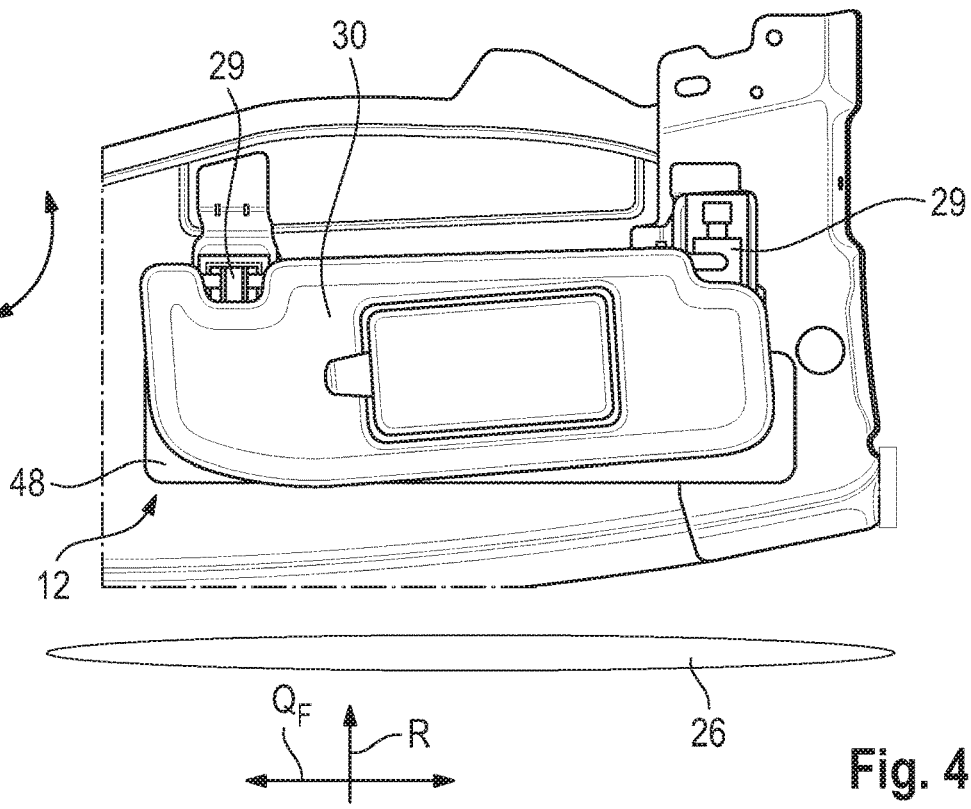
FIG. 4 shows the representation of FIG. 3 where additionally the sun visor is illustrated.
Figure 5:
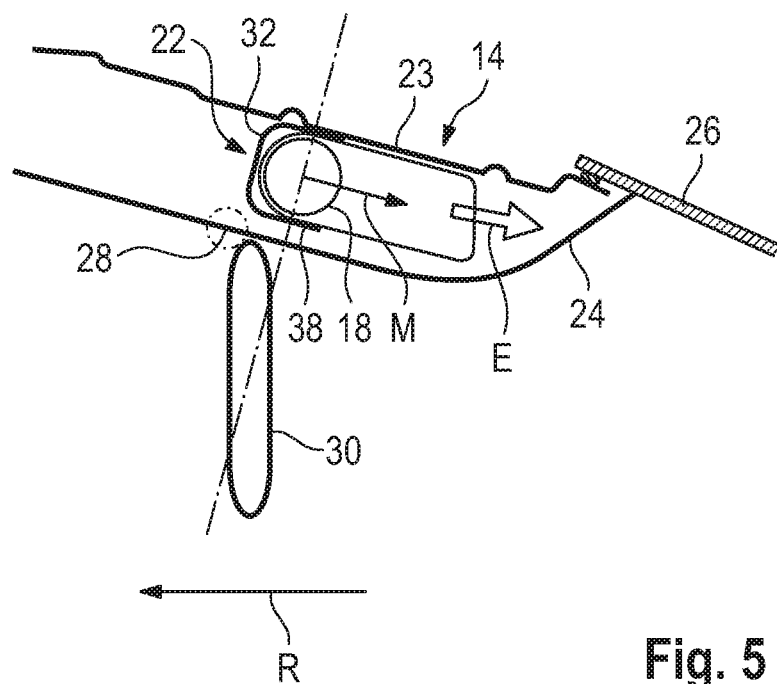
FIG. 5 shows a schematic sectional view of the vehicle occupant restraint system of FIG. 1 installed in the vehicle.
Figure 6:
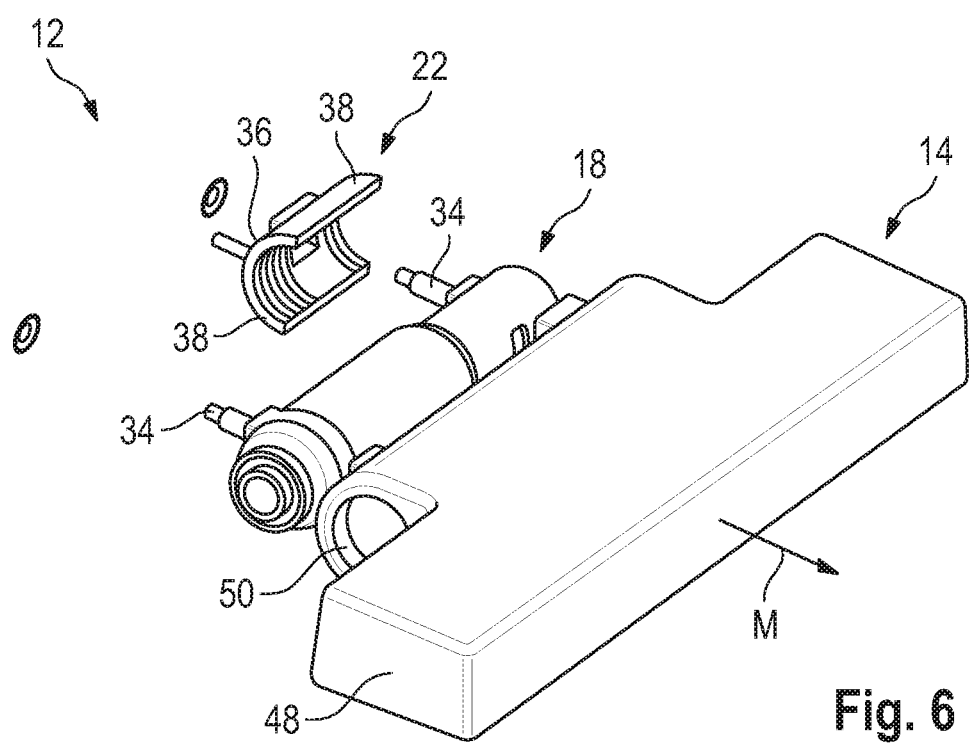
FIG. 6 shows a schematic exploded view of the airbag module of FIG. 1.

FIGS. 1 to 7 illustrate the set-up of a vehicle occupant restraint system 10 which in this example is designed to protect a passenger especially of a passenger car during frontal crash.

The vehicle occupant restraint system 10 comprises an airbag module 12 (cf. especially FIGS. 5 to 7) including a frontally acting airbag 16 folded into an airbag package 14 as well as an inflator 18 which supplies filling gas for inflating the airbag 16. The inflator 18 is inserted in the airbag 16 and thus is integrated in the airbag package 14.

Figure 29:
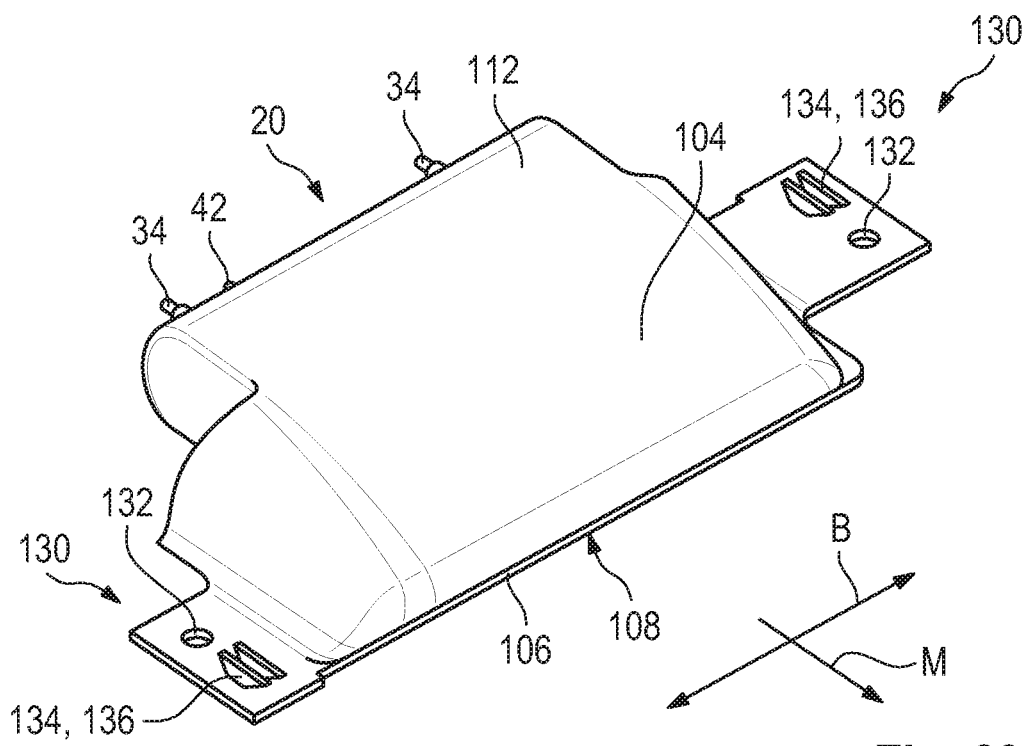
FIG. 29 shows a schematic perspective representation of the airbag package of FIG. 28 inserted in a wrapping.

The airbag package 14 and the inflator 18 are accommodated in a flexible wrapping 20 (see e.g. FIGS. 7 and 29) which will be described in detail further below and which has been omitted in FIGS. 1 to 6 for reasons of clarity.

Further, a module carrier 22 is provided (see FIGS. 2 and 6, for instance) via which the airbag module 12 is mounted tightly to the vehicle, for example to a roof rail 23 or any other rigid component in the roof area of the vehicle. The module carrier 22 is a formed sheet part, for example.

The airbag module 12 is arranged beneath a roof liner 24 (cf. e.g. FIG. 5), wherein it is located, when viewed along the longitudinal vehicle direction R, between a windshield 26 of the vehicle and a pivot axis 28 and, resp., the attachments 29 of a sun visor 30. The sun visor 30 may be pivoted about the pivot axis 28 as indicated e.g. in FIG. 1. The pivot axis 28 is not continuously physically realized. Instead, the sun visor 30 is pivotally attached to the roof liner by two attachments 29 (see FIGS. 1 and 4), wherein usually the sun visor 30 may be unhooked at the vehicle inward one of the two attachments 29 so as to laterally fold away the sun visor.

At least the folded airbag package 14 and, where appropriate, also the inflator 18 is/are located in the vehicle direction R, when viewed from the vehicle front end to the vehicle rear end, ahead of the pivot axis 28 of the sun visor 30.

A deployment direction E of the airbag 16 is directed along the longitudinal vehicle direction R in the direction of the vehicle front end and initially extends approximately in parallel to the vehicle roof and the windshield 26.

The airbag module 12 is located, when viewed in the transverse vehicle direction $Q_F$, on the passenger side approximately centrally above a passenger seat (not shown) so that the airbag 16 is capable of frontally absorbing the passenger. The airbag module 12 thus is disposed in the transverse vehicle direction $Q_F$ distant from the vehicle doors.

The module carrier 22 includes a holder 32 being C-shaped in cross-section and encompassing the inflator 18 at the inflator-side end side of the airbag package 14.

The inflator 18 in this case is a known elongate tubular inflator, with two fastening bolts 34 radially projecting from the cylindrical outside thereof. The fastening bolts 34 are located on a rear side of the inflator 18, on the opposite front side discharge orifices (not shown) are provided through which the filling gas leaves the inflator 18 and flows directly into the airbag 16.

The inflator 18 is disposed in the airbag module 12 so that its longitudinal axis extends transversely to the longitudinal vehicle direction R approximately in the transverse vehicle direction $Q_F$ and thus approximately normal to a longitudinal module direction M and the deployment direction E of the airbag 16. The longitudinal module direction M can be defined approximately by an extension of a diameter of the inflator 18 which is determined by the fastening bolts 34.

In the module carrier 22, more exactly speaking in a longitudinal side 36 of the C-shaped holder 32 located between the two arms 38 of the C shape, fastening holes 40 (cf. FIG. 2) are provided through which the fastening bolts 34 are passed so as to fasten the inflator 18 and the airbag package 14 tightly to the module carrier 22. On the rear side, the fastening bolts 34 may be secured by nuts, for example.

Figure 7:
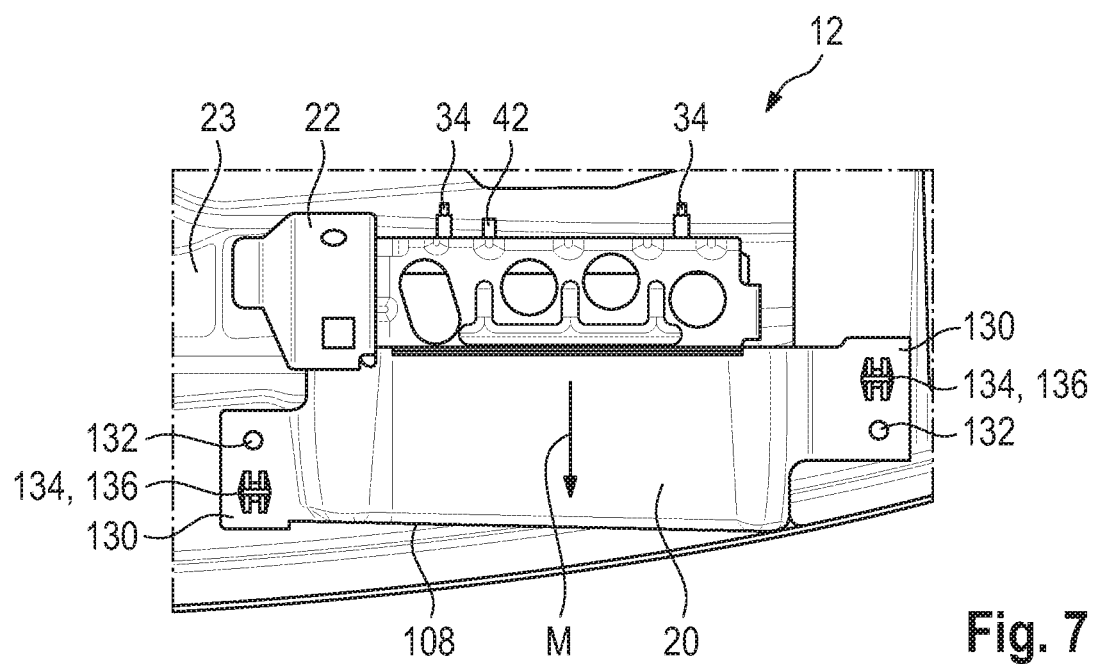
FIG. 7 shows a schematic top view onto the airbag module of FIG. 1 mounted on the roof.

In addition to the two fastening bolts 34, another bolt constituting a positioning bolt 42 is provided (see e.g. FIG. 7). A corresponding hole 44 is provided in the module carrier 22 (see FIG. 2). According to the Poka-Yoke principle, said positioning bolt 42 serves for preventing faulty assembly of the inflator 18.

Upon deployment of the airbag 16, filling gas flows from the inflator 18 into the airbag 16 through an inflation end 46 which is fastened on the inflator 18 as will be described in detail below. The pressure of the filling airbag 16 helps open the roof liner 24 either at a weakened zone or, for example, at the transition to the windshield 26 and allows the airbag 16 to exit into the vehicle interior. Accordingly, the roof liner 24 forms a lower delimitation of a passage for the airbag 16. An upper delimitation of said passage may be predefined by the roof rail 23. In this example, no further rigid guiding part such as a guiding plate is provided between the airbag 16 and the roof liner 24.

The arm 38 of the C-shaped holder 32 on the vehicle interior side does not extend, in the longitudinal vehicle direction R, beyond the outer wall of the inflator 18 and merely increases the stability of the module carrier 22 so that the latter deforms only insignificantly during deployment of the airbag 16, but it does not contribute to directing the airbag 16 by directly contacting the airbag 16.

Due to its position on the roof rail 23, the deploying airbag 16 does not contact the sun visor 30 or the attachments 29 thereof, either, while it exits into the vehicle interior.

Figure 8:
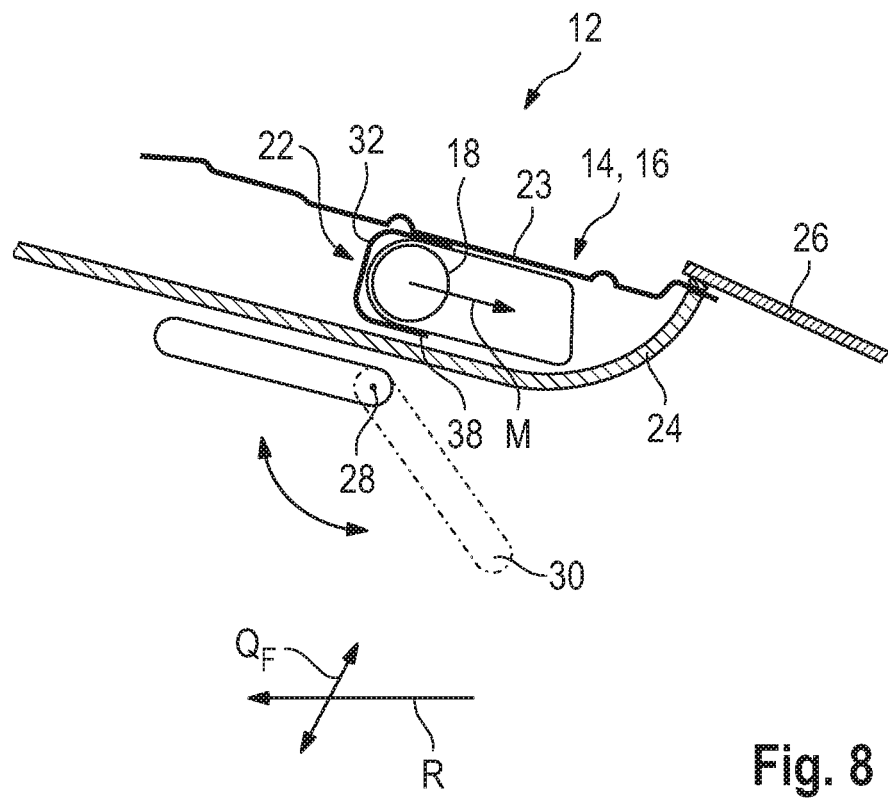
FIGS. 8 and 9 show the vehicle occupant restraint system of FIG. 1 in a schematic sectional view prior to deployment of the airbag and during the initial deployment phase of the airbag.
Figure 9:
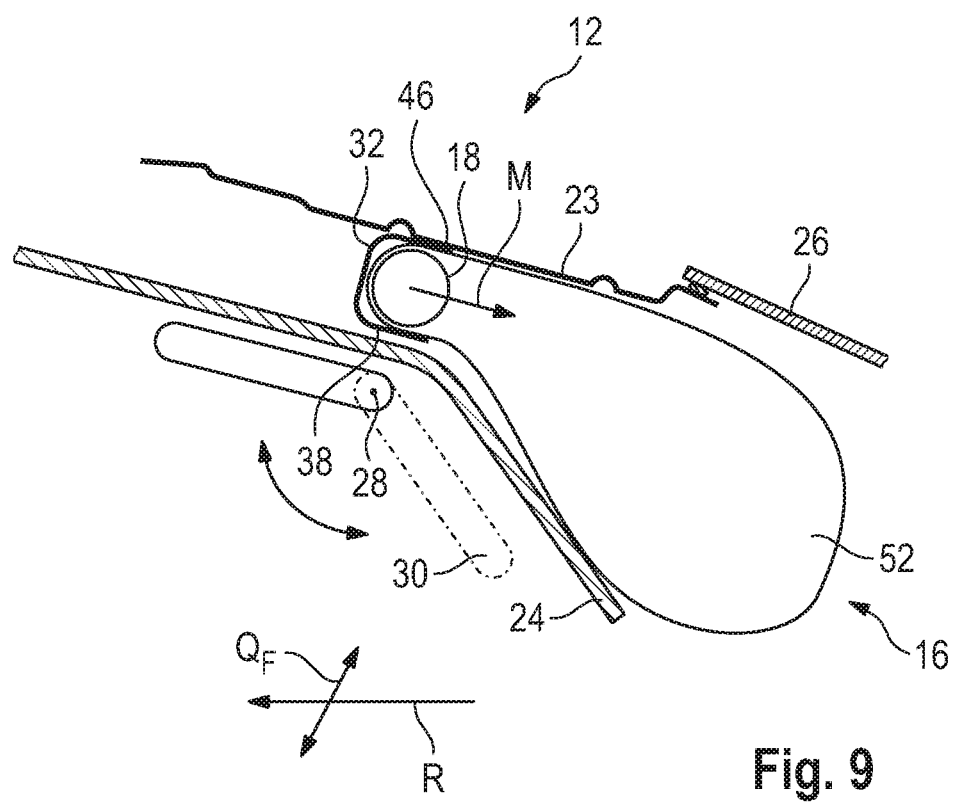
Figure 12:
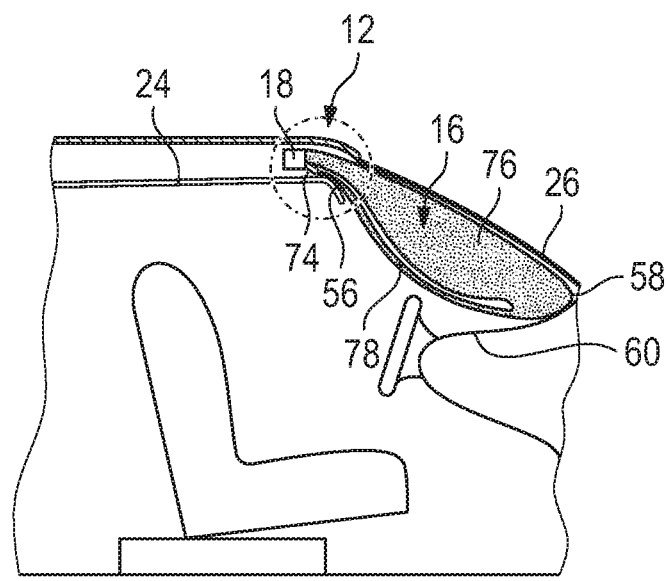
Figure 13:
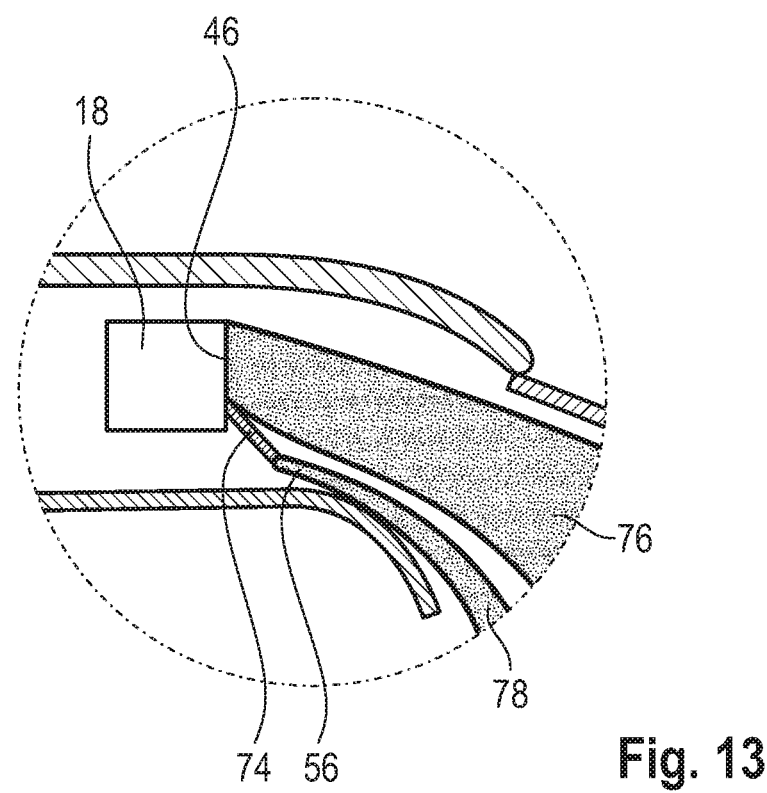

The initial deployment of the airbag 16 is illustrated in FIGS. 8 and 9.

FIGS. 10 to 17 show the deployment and the inflation of the airbag 16 in greater detail. Although in FIGS. 11 to 17 the steering wheel is visible, this is only due to the lateral view chosen for representation. The airbag 16 deploys exclusively on the passenger side in this example and laterally beside the steering wheel.

FIG. 10 shows the initial state prior to activation of the vehicle occupant restraint system 10.

The airbag package 14 initially lies folded beneath the closed roof liner 24. The airbag package 14 comprises two separately folded portions, viz. a main package 48 and a connecting portion 50 (indicated e.g. in FIGS. 1 and 3).

In the main package 48 a restraint part 52 of the airbag 16 is folded which in the deployed and inflated state covers the major part of the airbag volume and which substantially determines the restraining effect of the airbag 16. This is evident e.g. from FIGS. 17 and 19.

Figure 19:
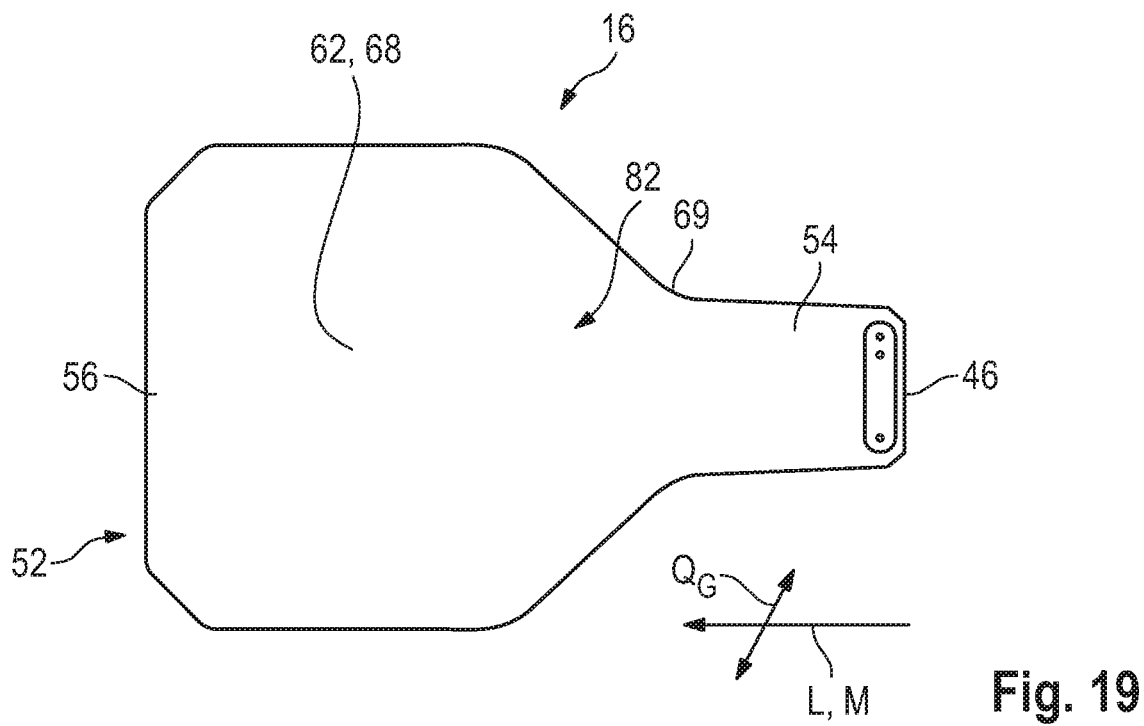
FIG. 19 shows the airbag of the vehicle occupant restraint system of FIG. 1 when being flatly spread in the non-inflated state in a top view onto a third outer wall portion of the airbag.
Figure 20:
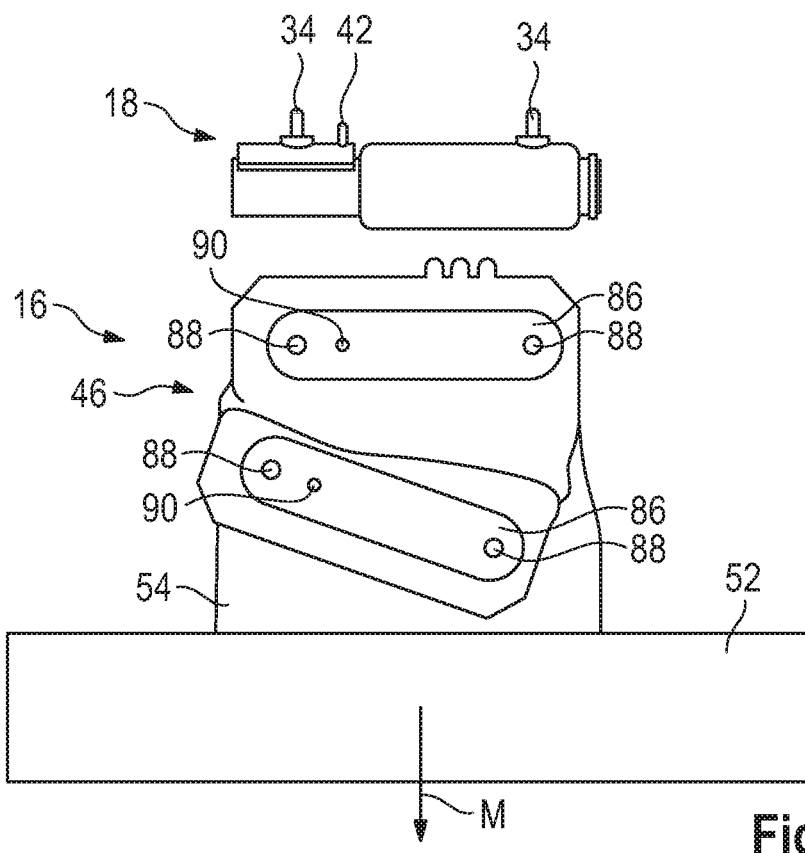
FIGS. 20 to 23 show a schematic representation of the insertion of an inflator into an inflation end of the airbag of the vehicle occupant restraint system of FIG. 1.
Figure 21:
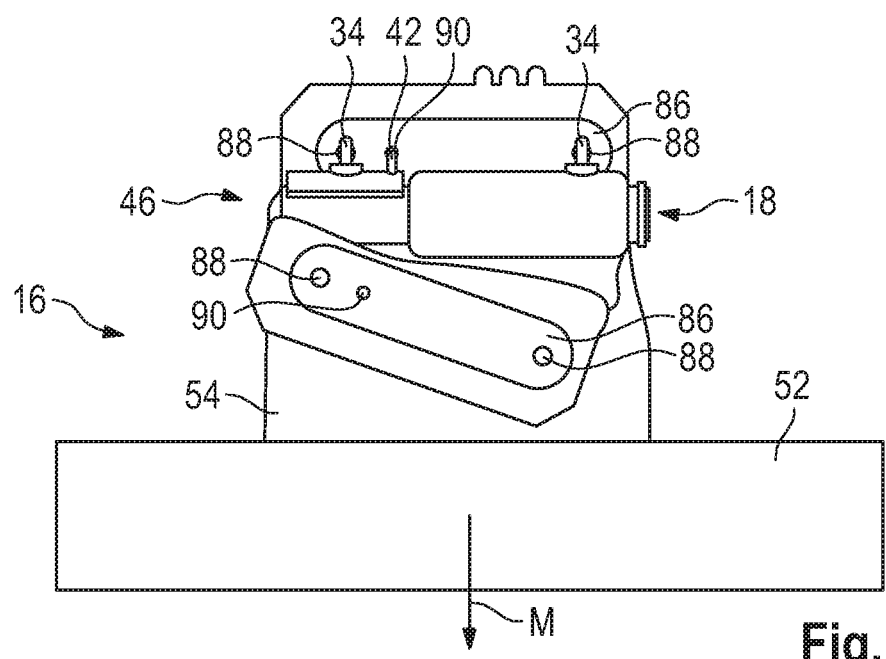

In the connecting portion 50 a neck 54 of the airbag 16 formed between the inflation end 46 and the restraint part 52 is folded (cf. also FIG. 19). In this example, the length of the neck 54 is approx. 5 to 40 cm, wherein those skilled in the art may easily adapt the exact length to the circumstances within the vehicle, e.g. the length of the passage and the position of the baffle of the airbag 16 in the inflated state.

In the transverse direction $Q_G$ of the airbag 16 normal to the longitudinal direction L thereof (cf. e.g. FIG. 19) and, resp., to the longitudinal module direction M, the neck 54 is definitely narrower than the restraint part 52. For example, the width of the neck 54 amounts to about 25-50% of the maximum width of the flatly spread restraint part 52. Thus, the filling volume of the neck 54 is definitely smaller than that of the restraint part 52.

The neck 54 in this embodiment does not contribute to the restraining effect as it acts high above in the vehicle directly on the roof liner. By decreasing the volume of the neck 54 by reducing its width, thus material, filling gas and space can be saved in the airbag module 12.

Figure 36:
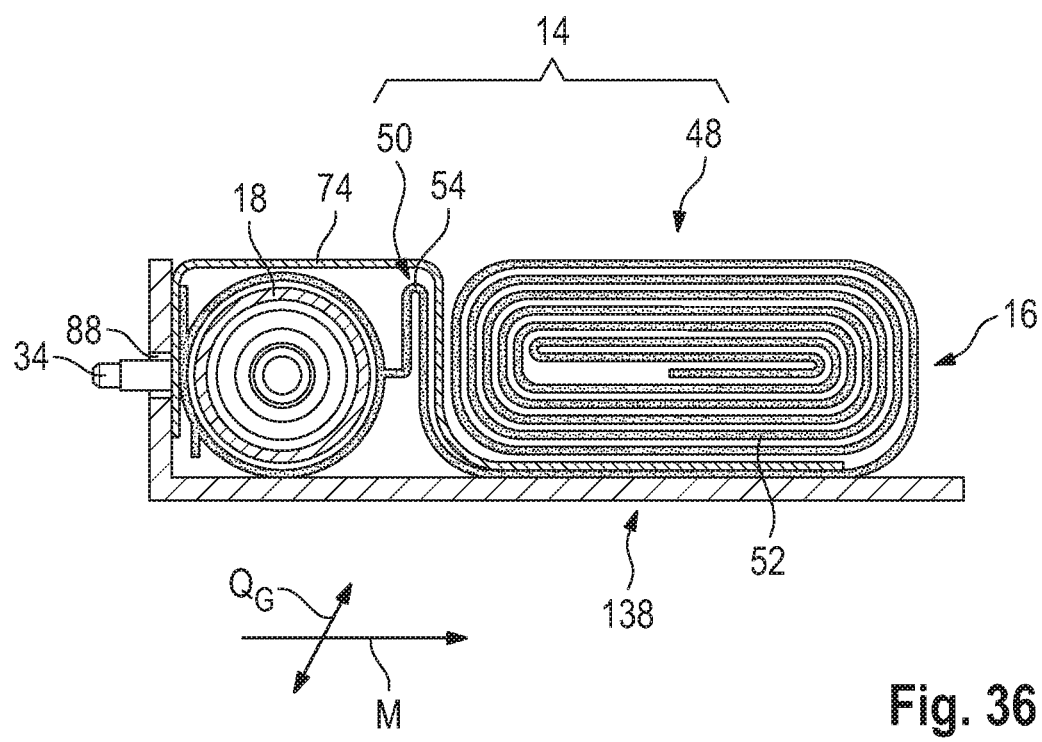
FIG. 36 shows the airbag package in a schematic sectional view being inserted in a folding device.

The connecting portion 50 and the main package 48 constitute two portions of the airbag package 14 folded separately from each other, as is evident from FIG. 36, for example.

Whereas the main package 48 is folded and rolled, for example, as will be illustrated later, the connecting portion 50 in this case is merely folded in zigzag folding having one to three folds in this example. The folds are strung in series in the longitudinal module direction M in this case.

In the longitudinal module direction M, the inflator 18, the connecting portion 50 and the main package 48 are located linearly in series.

This arrangement causes filling gas to flow from the inflator 18 at first into the neck 54 folded in the connecting portion 50. Due to the mere zigzag folding, the folds are filling one by one, which results in the fact that the connecting portion 50 will stretch and thus will exert a force acting in the longitudinal module direction M on the still folded main package 48.

As a result, the main package 48 presses the roof liner 24 open and is pushed into the vehicle interior while still being substantially folded. This situation is schematically shown in FIG. 11.

At this point in time, substantially no gas flows into the main package 48, as the gas flow is blocked by the still existing folds of the connecting portion 50.

Although here this folding technique and the sliding of the main package 48 into the vehicle interior is described in connection with an airbag module 12 fastened to the roof, according to the invention this technique may be conferred upon airbag modules that are used at other locations within the vehicle, such as in the knee area or in a backrest.

In a side view, the completely inflated airbag 16 approximately takes a Y-shape or T-shape (see FIG. 17), with the stem of the Y or T being formed by the inflation end 46 and the neck 54. The restraint part 52 comprises a first free end 56 as well as a second free end 58. This is evident for the inflated airbag 16 in FIG. 17 and for the non-inflated, flatly spread airbag 16 e.g. in FIG. 18 which illustrates the non-inflated airbag 16 in a lateral sectional view, wherein the usually flatly superimposed layers are shown to be somewhat pulled apart for reasons of clarity.

In the fully inflated state, the second free end 58 is located in a transition between the windshield 26 and an instrument panel 60 of the vehicle, while the first free end 56 extends in the direction of the vehicle occupant and forms a lower end of the total airbag 16 as well as of a baffle 62 for absorbing the vehicle occupant.

Figure 18:
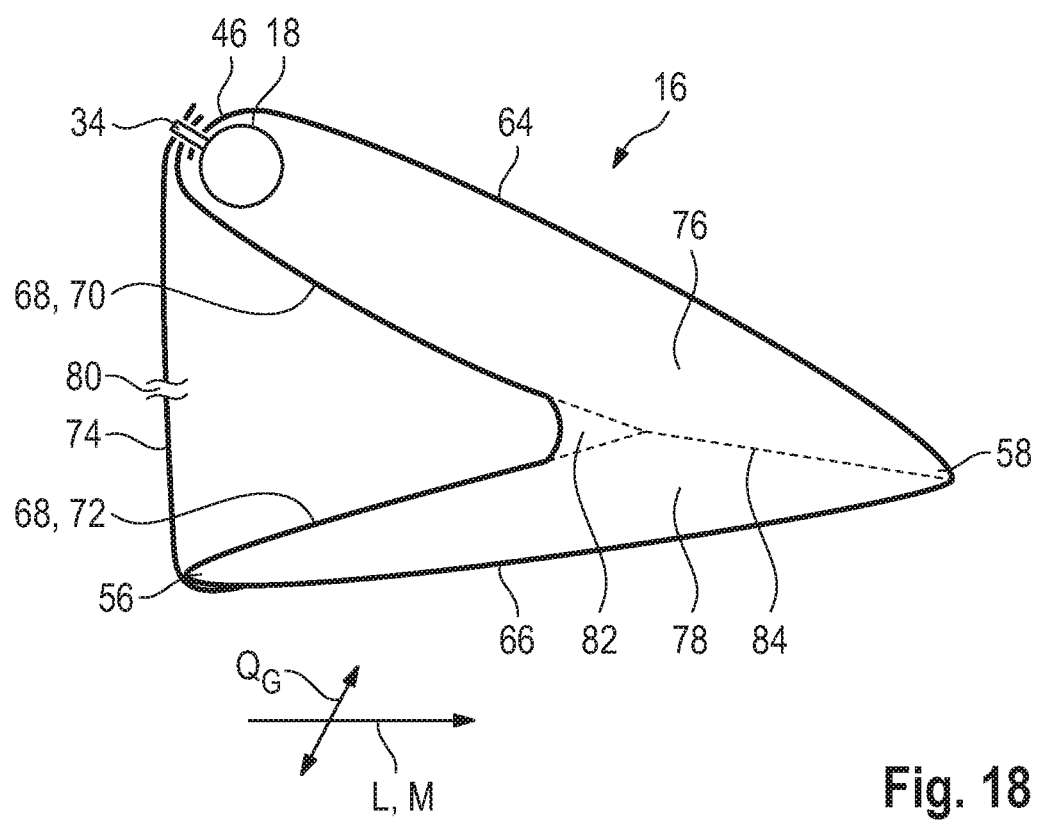
FIG. 18 shows a schematic sectional view of the airbag of the vehicle occupant restraint system of FIG. 1 with the inflator being inserted.

The airbag 16 substantially includes three large outer wall portions 64, 66, 68 (see FIG. 18). A first outer wall portion 64 extends from the inflation end 46 to the second free end 58 and in the inflated state forms a bearing surface for the airbag 16 on the windshield 26. A second outer wall portion 66 extends from the second free end 58 to the first free end 56 and in the inflated state is located above the instrument panel 60. A third outer wall portion 68 extends from the first free end 56 to the inflation end 46 and in the inflated state of the airbag 16 forms the baffle 62 for the vehicle occupant.

In the third outer wall portion 68 the neck 54 is transformed into the restraint part 52 via a shoulder 69 which is beveled on both sides so that a continuous transition is formed from the neck 54 into the baffle 62 (cf. FIG. 19).

In the folded main package 48, however, the first free end 56 is folded back toward the inflation end 46 so that portions 70, 72 of the third outer wall portion 68 are folded back onto themselves. Accordingly, initially the free end 56 is connected to the inflation end 46 by a tether 74. This is shown in detail in FIGS. 12, 13 and 18.

The tether 74 in this example is not fixed directly to the first free end 56 but offset by about 5 to 20 cm on the second outer wall portion 66. This permits a more compact folding of the airbag package 14, as will be described below.

This fact as well as the folding of the main package 48 described later in detail ensure that at the time when the main package 48 arrives in the vehicle interior the first free end 56 is still withheld by the tether 74 in the roof area. The remainder of the main package 48 meanwhile continues deploying in the vehicle interior, wherein the filling gas flowing into the airbag 16 at first inflates only a partial area of the airbag 16.

Figure 14:
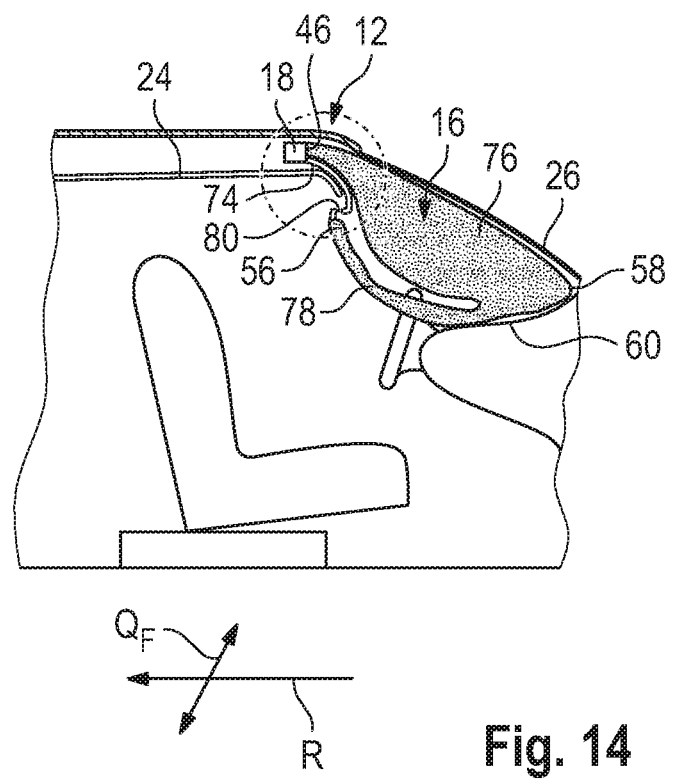
Figure 15:
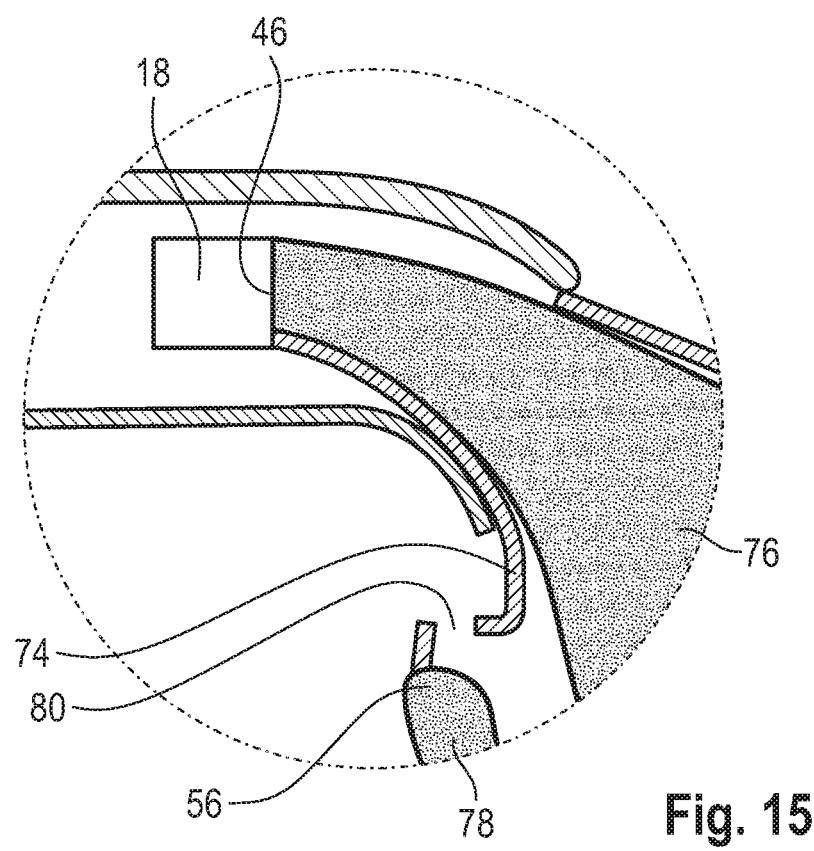

It is evident from FIGS. 14 and 18 that at this time when the first free end 56 is still connected to the inflation end 46 via the tether 74, the airbag 16 takes approximately a U-shape having an inner leg 76 and an outer leg 78.

The inner leg 76 of the U is delimited toward the windshield 26 by the first outer wall portion 64 of the airbag 16. Toward the passenger compartment, the inner leg 76 is delimited by an upper portion 70 of the third outer wall portion 68.

The outer leg 78 is delimited toward the instrument panel 60 by the second outer wall portion 66. Toward the vehicle interior, the outer leg 78 is delimited by a lower portion 72 of the third outer wall portion 68.

The two portions 70, 72 of the third outer wall portion 68 are initially held together by the tether 74. In this way, filling gas flows only into the inner leg 76, while the outer leg 78 still remains substantially unfilled, although the airbag package 14 already has largely deployed. This situation is illustrated in FIGS. 12 to 15.

When a particular tensile force which is accompanied by a predetermined filling volume of the airbag 16 is exceeded, the tether 74 becomes detached after a first period of time following activation of the inflator 18. In this example, for this purpose a weakened zone 80 is formed on the surface of the tether 74 (see FIG. 18).

Figure 16:
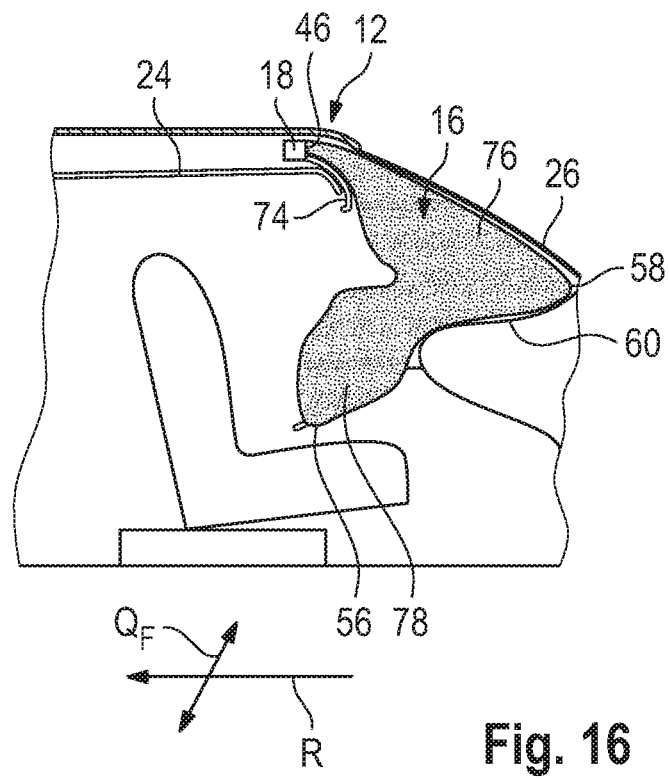

At the time when the tether 74 becomes detached, the neck 54 is already fully inflated in this example (see FIG. 16).

Figure 17:
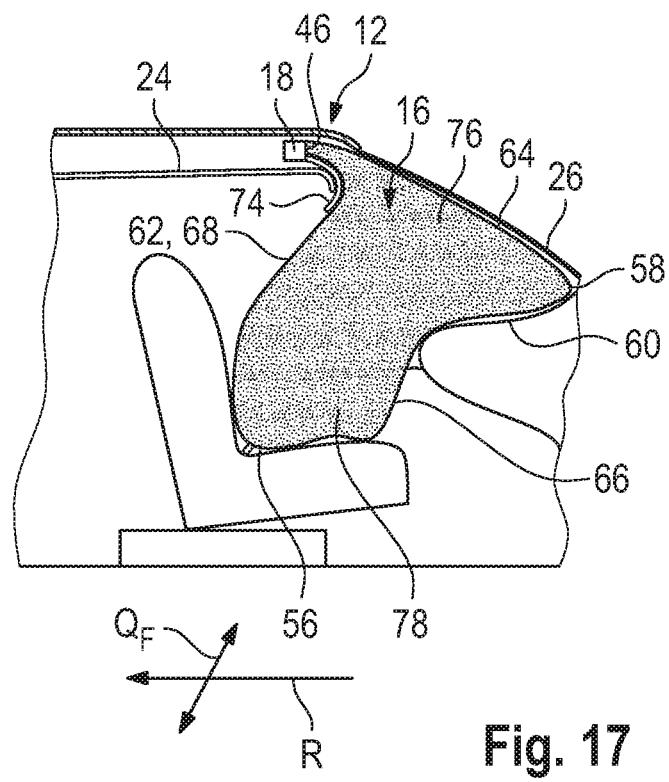

In a second period following the first period, the airbag 16 is completely filled after the tether 74 has split into two parts at the weakened zone 80. The completely inflated state is shown in FIG. 17.

In the fully inflated state, the airbag 16 takes approximately a Y-shape or a T-shape, when viewed from the side, as the inner leg 78 has folded downwards in the vehicle interior. The arms of the Y then are formed by two inflated portions of the restraint part 52 each of which extends from the first and second free ends 56, 58 toward the inflation end 46 and both of which merge into the neck 54.

Moreover, in the third outer wall portion 68 a bag 82 inwardly reversed in the folded state (see FIG. 18) is formed which in the fully inflated airbag 16 bulges partly outwardly and thus enlarges the baffle 62. A lower end of the bag 82 is permanently connected to the second free end 58 via an inner tether 84, however, so as to stabilize the shape of the inflated airbag 16.

Preferably, before the airbag 16 is folded, the inflator 18 is fixed at the inflation end 46 within the airbag 16, as is shown in FIGS. 20 to 23. If necessary, this step might also be taken after folding the airbag 16, however.

At the inflation end 46 the airbag 16 ends in two opposite tabs 86 each of which extends over the entire width of the neck 54. Each of the tabs 86 includes two fastening holes 88 as well as a positioning hole 90 corresponding, as to their arrangement, to the fastening bolts 34 and the positioning bolt 42 at the inflator 18 (see e.g. FIG. 20).

Inside the airbag 16 each of the two tabs 86 may be reinforced by one or more reinforcing layers which also may include a temperature-resistant and gastight coating, where necessary.

Figure 22:
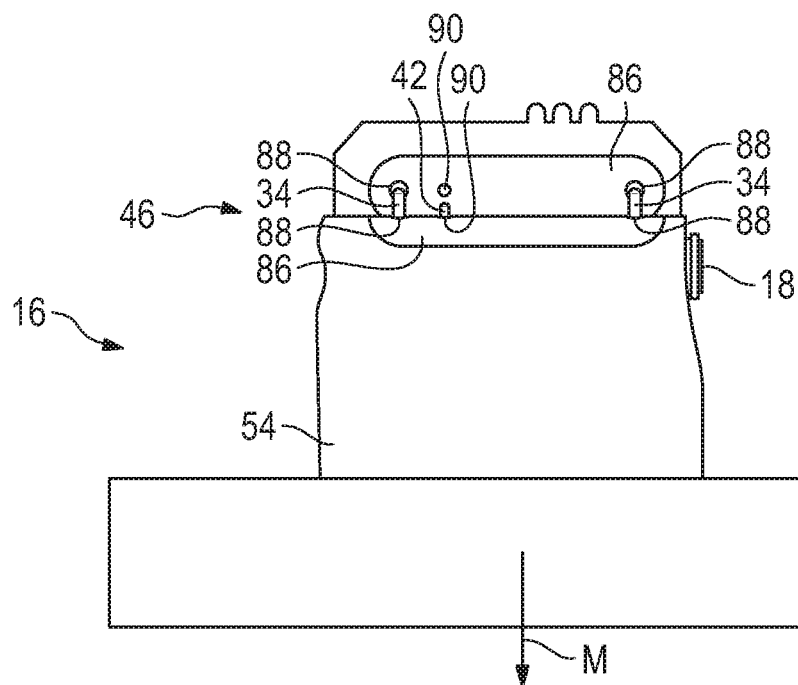
Figure 23:
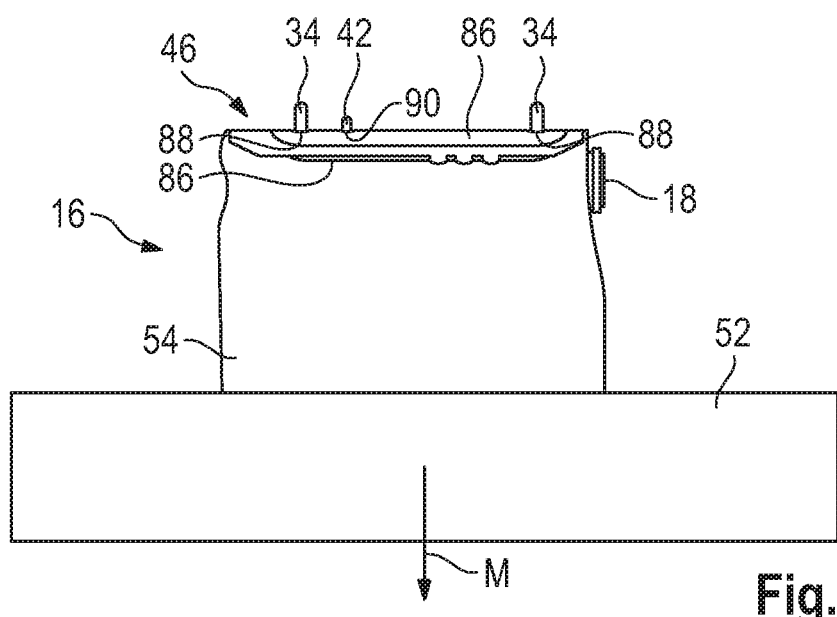

For assembly of the inflator 18, the latter is placed between the two tabs 86 (FIG. 21) and then the two tabs 86 are individually wrapped over the inflator 18, with the fastening hole 88 being pulled over the fastening bolts 34 and the positioning hole 90 being pulled over the positioning bolt 42 (FIGS. 22 and 23).

Due to the wrapping by the two tabs 86 and, if necessary, the coating provided on the inside of the tabs 86, the inflator-side inflation end 46 of the airbag 16 now is sufficiently sealed in a gastight manner.

The tabs 86 now are secured to the fastening bolts 34 by means of clamping washers and/or screw nuts (not shown).

Figure 24:
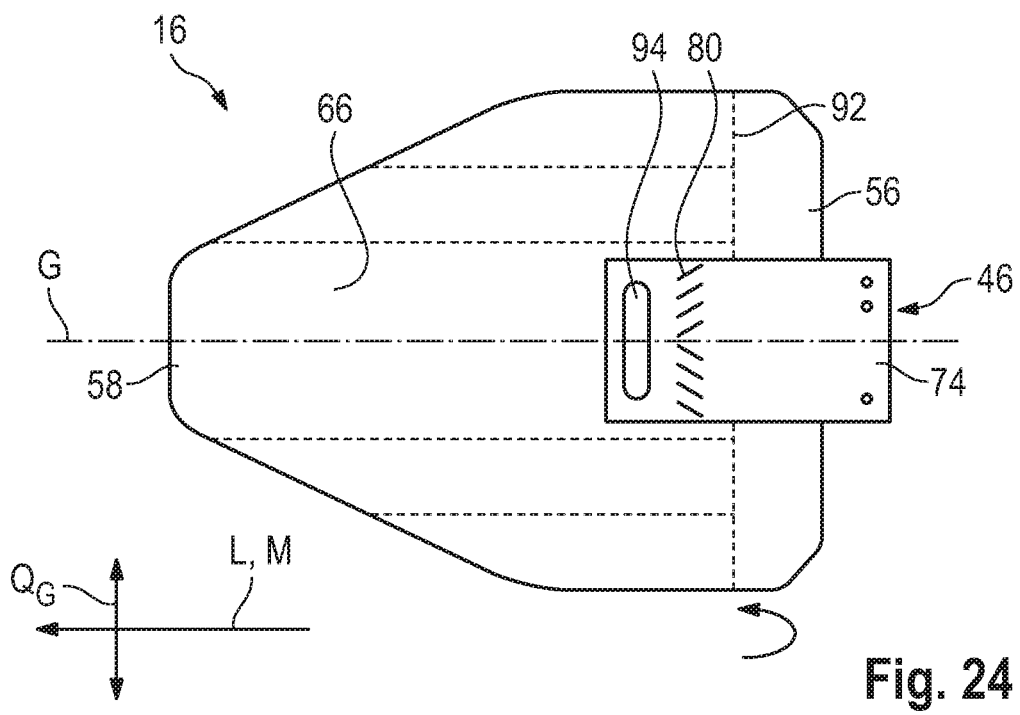
FIGS. 24 to 27 show steps of folding the airbag of the vehicle occupant restraint system of FIG. 1 when viewed in a top view.

For folding the airbag 16 into the airbag package 14, the airbag 16 is initially flatly spread as shown in FIG. 24, with the first end 56 being folded back to the inflation end 46.

Thus, in the area of the first free end 56 the two legs 76, 78 of the airbag 16 are superimposed. The third outer wall portion 68 is folded back onto itself in the portions 70, 72.

Each of the first outer wall portion 64 and the second outer wall portion 66, on the other hand, extends stretched from the second free end 58 to the inflation end 46.

The tether 74 is positioned so that its free end is located on the inflation end 46.

Figure 25:
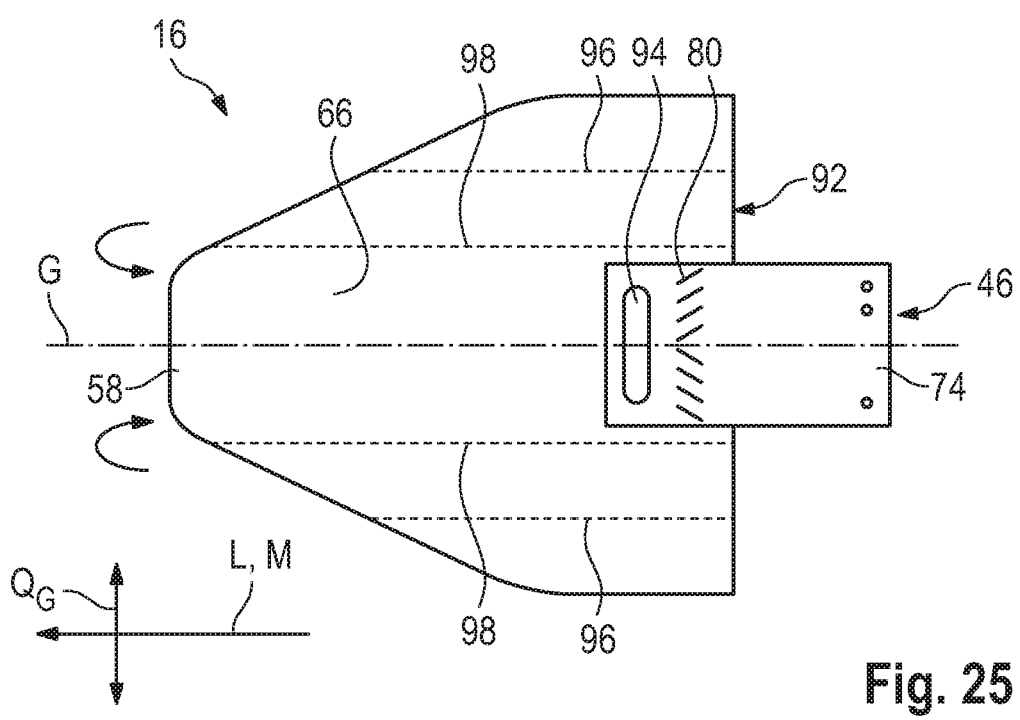

In a first folding step, the first free end 56 now is folded once about a folding line 92 located perpendicularly to the longitudinal airbag direction L (which in the flatly spread airbag 16 coincides with the longitudinal module direction M) but not over an attachment point 94 of the tether 74 on the second outer wall portion 66 (see FIGS. 24 and 25). Depending on the shape of the airbag, this folding step might be omitted as well.

Figure 26:
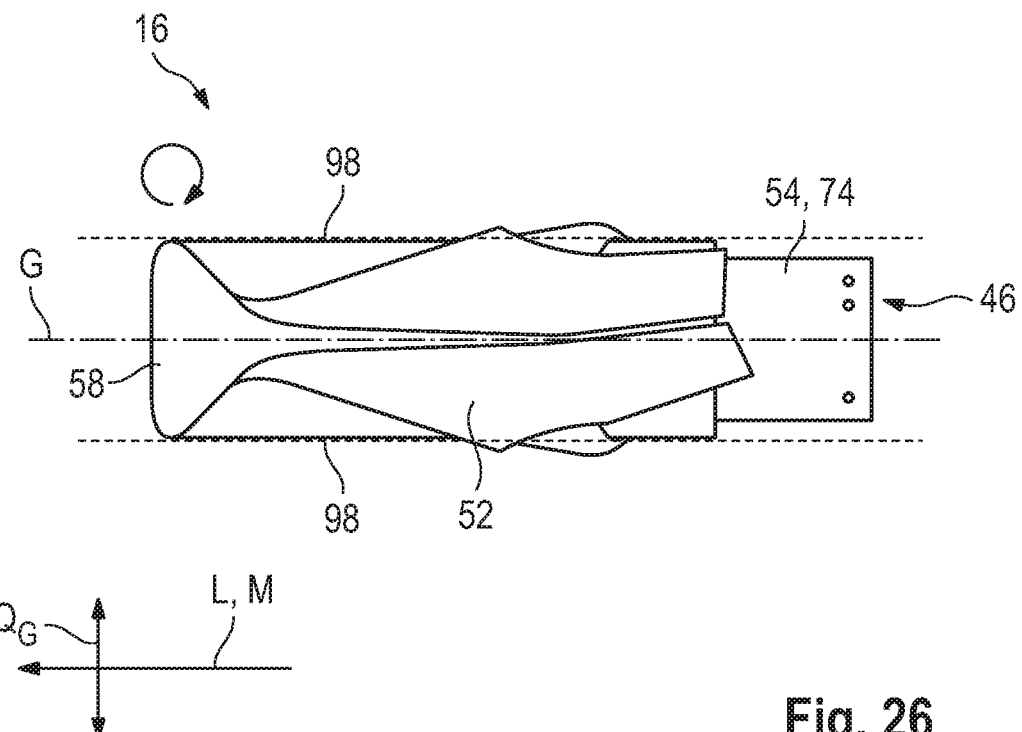

Now in a second folding step, the two lateral areas of the airbag 16 are folded inwardly in a zigzag fold along folding lines 96, 98 extending in parallel to the longitudinal airbag direction L. This is shown in FIGS. 25 and 26. The two folding lines 98 now delimit the airbag 16 laterally outwardly in the transverse direction $Q_G$.

The distance of the folding lines 96, 98 from each other and from a peripheral edge of the airbag 16 is selected so that in the center of the airbag no overlapping of the lateral areas of the airbag 16 will occur, wherein the center of the airbag 16 is defined by an imaginary center line G extending from the inflation end 46 to the second free end 58 and being arranged symmetrically to the inflation end 46.

In the spread state, the airbag 16 can be symmetrical with respect to said center line G, however this is not imperative but is determined, inter alia, by the geometry of the passenger compartment, the windshield 26 and the instrument panel 60.

Figure 27:
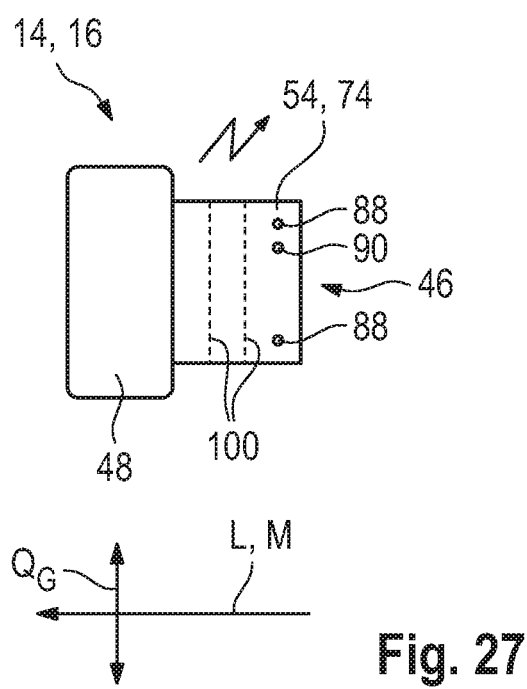

The partially folded airbag 16 shown in FIG. 26 now is rolled up in a rolling step starting from the second free end 58, for example in three to ten turns, especially in six turns, toward the inflation end 46. The result of this folding step is illustrated in FIG. 27. The rolled-up area now forms the main package 48. The airbag 16 is rolled up only to the end of the restraint part 52 of the airbag 16. The areas of the neck 54 and of the tether 74 projecting therefrom in the direction of the inflation end 46 (see FIGS. 26 and 27) remain unaffected by this folding step.

In another folding step, the area of the neck 54 as well as, where necessary, of the tether 74 projecting from the main package 48 is folded into a mere zigzag folding having about one to three folds, with the folding lines 100 being aligned perpendicularly to the module direction M and thus in parallel to a longitudinal axis of the inflator 18 (not shown here). Now the folded airbag package 14 takes the shape shown in FIGS. 27 and 36.

The same hole structure 88, 90 as at the tabs 86 of the airbag 16 is realized also at the free end of the tether 74, and the tether 74, too, is pulled over the fastening bolts 34 and the positioning bolt 42 with the fastening holes 88 and the positioning hole 90 (see also FIG. 36). The two tabs 86 and the tether 74 now are superimposed in three layers, with the fastening bolts 34 of the inflator 18 passing through all three aligned fastening holes 88. This applies mutatis mutandis to positioning holes 90.

In the mounted state, the airbag 16 is connected to the module carrier 22 in a load-bearing manner via the fastening bolts 34. The tensile forces acting on the tether 74 are also transmitted to the module carrier 22 via the fastening bolts 34.

Figure 28:
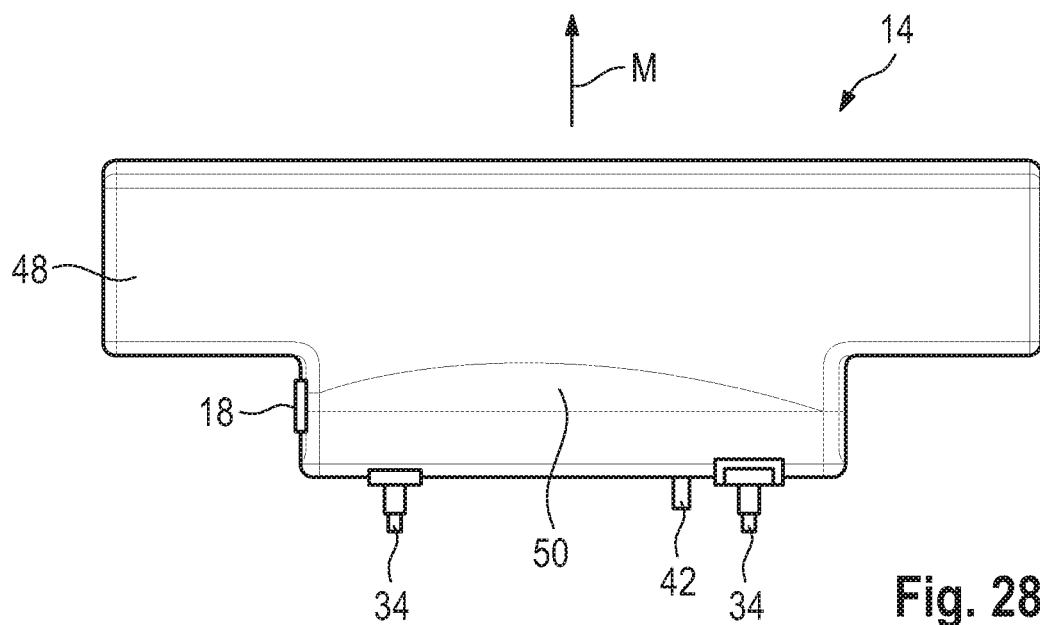
FIG. 28 shows a schematic representation of the folded airbag package of the vehicle occupant restraint system of FIG. 1.

After inserting the inflator 18 and folding the airbag 16, the airbag package 14 takes the shape as shown in FIG. 28.

After having fixed the inflator 18 in the airbag 16 and having folded the airbag 16 into the airbag package 14, the airbag package 14 is inserted along with the inflator 18 into the wrapping 20.

The FIGS. 29 to 35 illustrate the wrapping 20 in detail.

Figure 30:
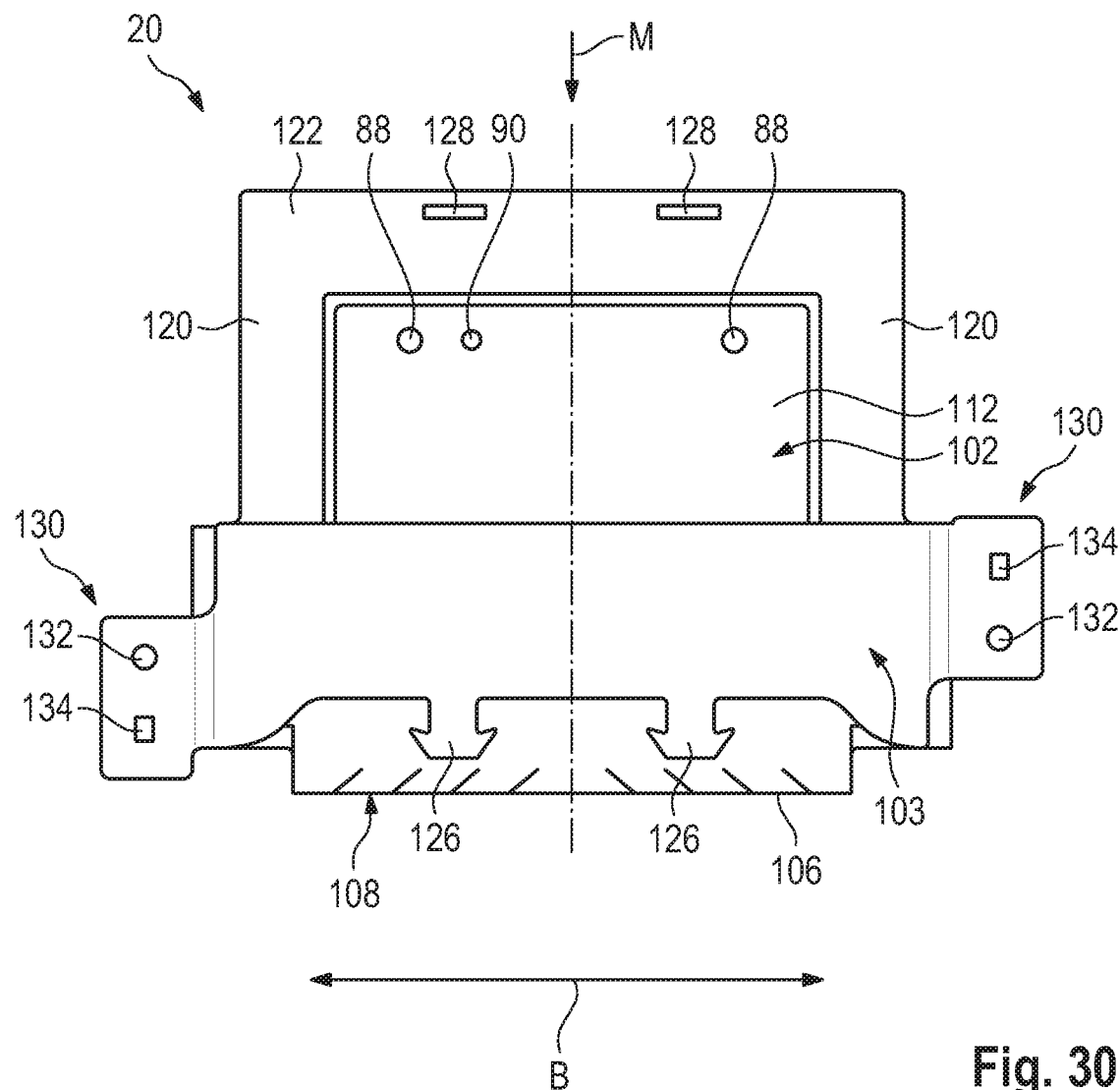
FIG. 30 shows a schematic top view onto the wrapping of FIG. 29.

In this example, the wrapping 20 consists completely (except for possible seams, of course) of airbag fabric and is composed of exactly two cut parts 102, 103 (see FIG. 30).

The wrapping 20 includes a holding bag 104 (see FIG. 31) that is formed by two folded portions of the first cut part 102 and serves for holding the main package 48 of the airbag package 14. A bottom 106 of the holding bag 104 is provided with a weakened zone 108 (see FIG. 30, for example) and extends in a direction B normal to the module direction M.

Each of the two edges 110 (cf. FIG. 31) of the holding bag 104 facing away from the bottom 106 in one piece and seamlessly merges into a respective retaining tab 112. The two retaining tabs 112 form an inflator fixation 114 for fixing the inflator 18 within the wrapping 20 and at each of their free ends include a hole pattern corresponding to the arrangement of the fastening bolts 34 and the positioning bolt 42. Accordingly, at the free edge of each retaining tab 112 two fastening holes 88 as well as one positioning hole 90 are provided.

The holding bag 104 and the retaining tabs 112 are jointly realized in the first cut part 102 by the first cut part 102 being folded back onto itself and the longitudinal edges adjacent to the folding line being connected in portions so as to form the holding bag 104. The free portions exceeding the holding bag 104 then form the retaining tabs 112 (cf. e.g. FIGS. 30 and 31).

Figure 31:
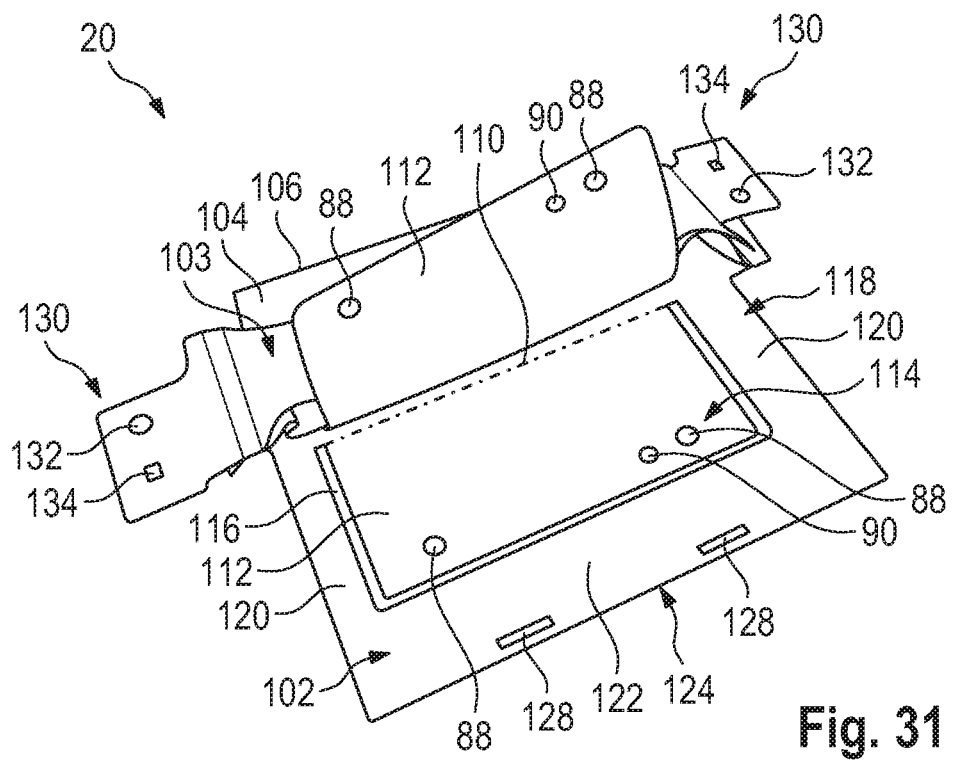
FIG. 31 shows a schematic perspective representation of the wrapping.

One of the retaining tabs 112, in FIG. 31 the flatly spread lower retaining tab 112, is separated by a U-shaped intersecting line 116 from a surrounding remainder of the first cut part 102. The intersecting line 116 forms a bracket 118 having two belt portions 120 located on the side of the retaining tab 112 as well as a web 122 connecting the two belt portions 120. The belt portions 120 merge into the holding bag 104 in one piece at their end opposite to the web 122.

The bracket 118 is part of an airbag package fixation 124. In addition, the latter includes at least one pair of first and second fixing elements 126, 128 adapted to be nested and thus to be fixed to each other. In this case, two pairs of fixing elements 126, 128 are provided which are juxtaposed in parallel to the direction B of the bottom 106. The exact position and number of fixing elements as well as the formation thereof are at a skilled person's discretion, of course.

In this example, the first fixing elements 126 are formed at the second cut part 103 extending in parallel to the direction of the bottom B over the holding bag 104. The first fixing elements 126 in this example take the shape of arrow-type hooks (cf. especially FIGS. 30 and 35) which are formed at an edge of the second cut part 103 facing the bottom 106.

Figure 35:
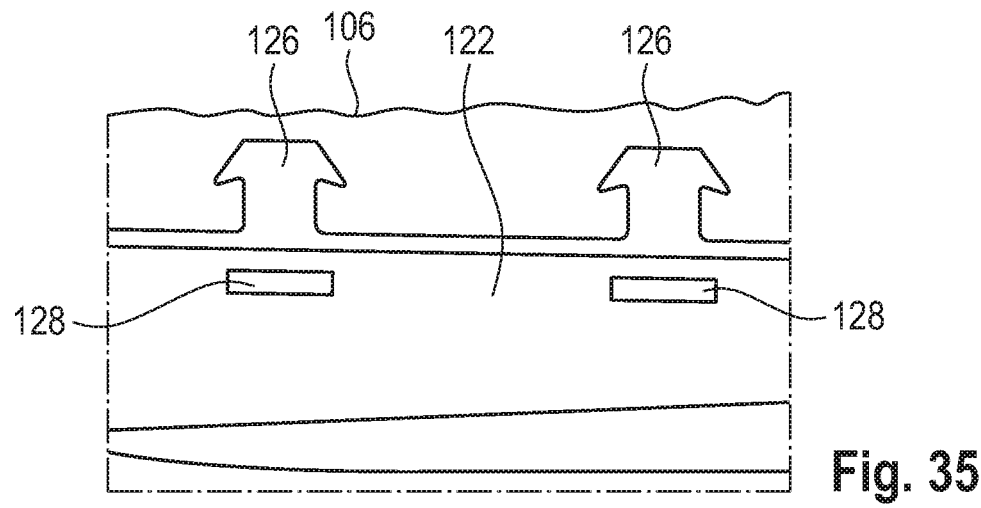
FIG. 35 shows details of the airbag package fixation of the wrapping.

Each of the two second fixing elements 128 is configured in the web 122 and here is formed by an elongate opening each through which the hook of the first fixing element 126 can be inserted so that the hook edges engage behind the edge of the opening and fix the first fixing element 126 to the web 122. FIG. 35 shows a detailed view of the fixing elements 126, 128.

The second cut part 103 in this embodiment is made from multi-layer airbag fabric, whereas the first cut part 102 is cut out of a single-layer airbag fabric. Cutting is performed by laser-cutting in this case, thus causing in the second cut part 103 the edges of the plural layers to be welded directly to each other without any further fixation of the edges to each other being required. Since, in this way, also the first fixing elements 126 are made from multi-layer airbag fabric, they have sufficient stiffness so as to get caught in the openings of the second fixing elements 128.

The second cut part 103 extends beyond the holding bag 104 laterally, viz. in parallel to the bottom direction B. At each of its free ends, a fixing portion 130 which serves for fastening the wrapping 20 tightly to the vehicle is formed. Said fastening need not bear the complete load of the deploying airbag 16, but primarily serves for positioning the airbag module 12 on the roof rail 23.

However, here the fixing portions 130 are also used for prefixing the airbag module 10 in the vehicle. For this purpose, each of the fixing portions 130 includes, apart from a fastening hole 132 through which e.g. a screw for vehicle-tight fastening is inserted, a further prefixing hole 134 in which a fastening clip 136 is inserted (see FIG. 34). When assembling the airbag module 10 to the vehicle, the fastening clip 136 is pushed into an opening on the roof rail 23 or on the module carrier 22 and maintains the airbag module 10 in position until the final fastening is completed.

The fastening hole 132 and the prefixing hole 134 are arranged in the two fixing portions 130 each in parallel to the longitudinal module direction M on top of each other but in a different order (see e.g. FIG. 30).

Figure 32:
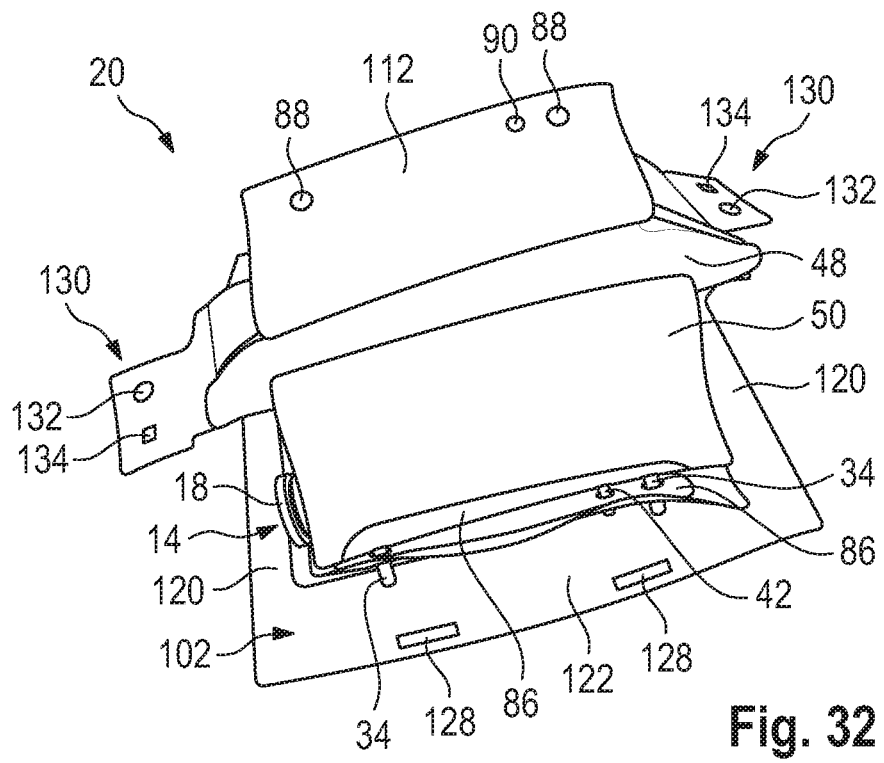
FIGS. 32 to 34 show the insertion of the airbag package into the wrapping.
Figure 33:
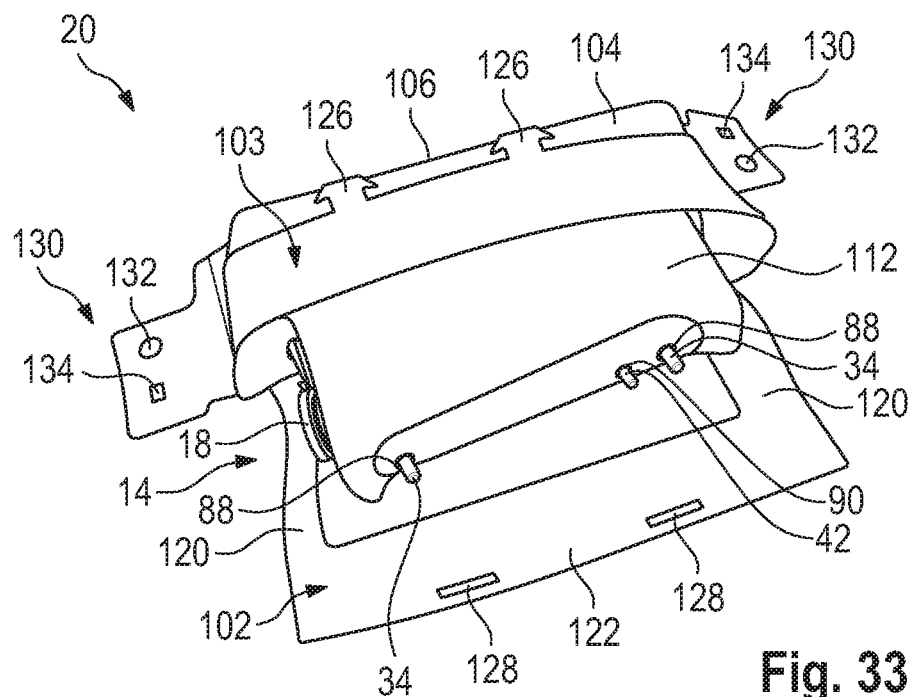
Figure 34:
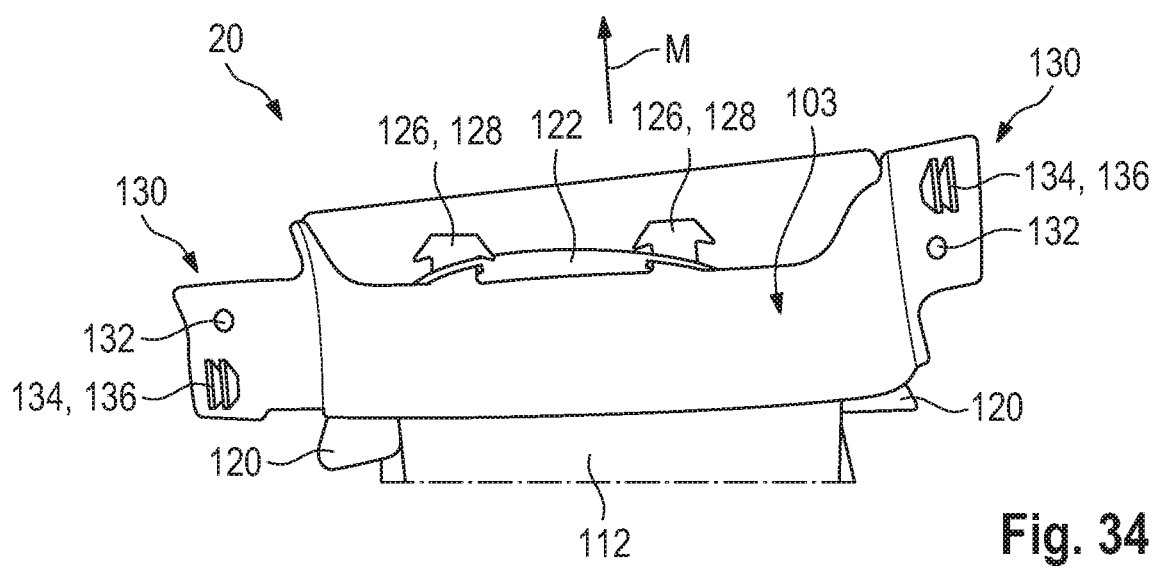

For inserting the airbag package 14 into the wrapping 20, initially the main package 48 is inserted into the holding bag 104 (see FIGS. 31 and 32). Then the two retaining tabs 112 are successively pulled with the fastening holes 88 and the positioning holes 90 over the fastening bolts 34 and the positioning bolt 42 of the inflator 18 so that they encompass the inflator 18 as well as naturally the inflation end 46 of the airbag 16 on the rear side of the inflator 18 (cf. FIGS. 32 and 33 as well as 37 and 38).

Figure 37:
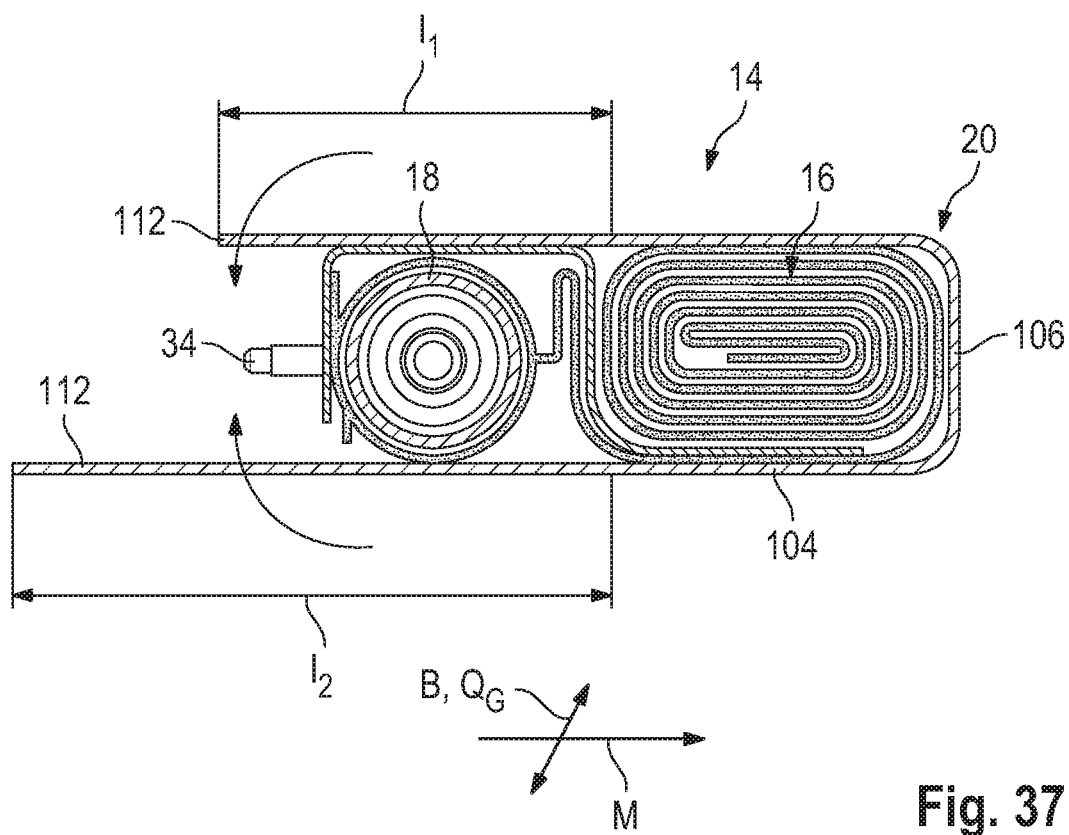
FIGS. 37 and 38 show the closing of an inflator fixation of the wrapping.
Figure 38:
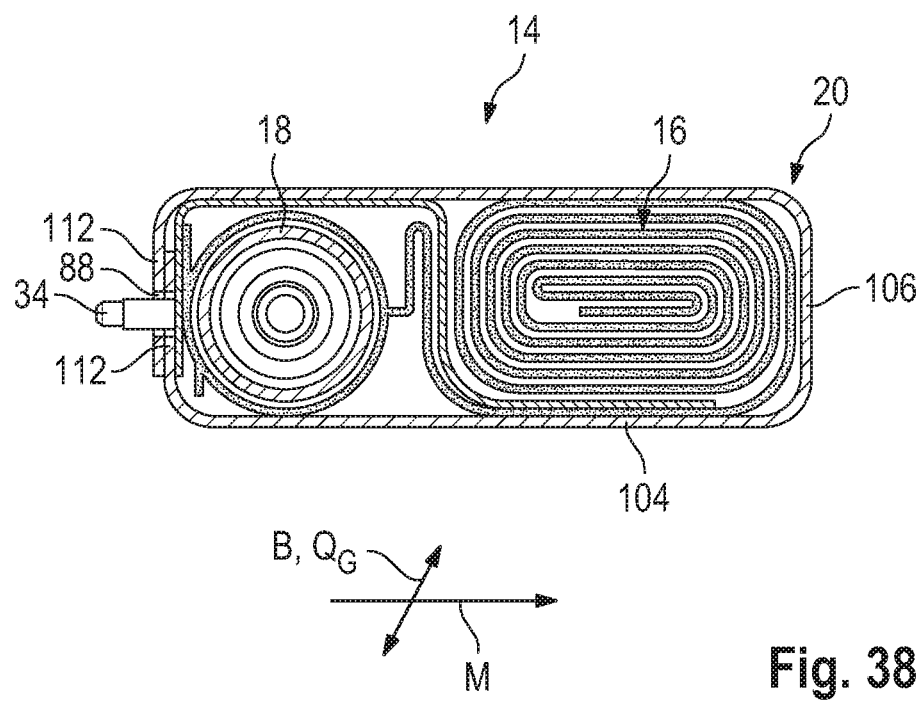

In the longitudinal module direction M, the two retaining tabs 112 may have different lengths $l_1$, $l_2$ as shown in FIG. 37, for example. In this way, the tensile forces acting via the retaining tabs 112 upon the fastening bolts 34 of the inflator 18 can be adjusted to a certain degree. As a result, the alignment of the inflator 18 with respect to rotation about the longitudinal axis thereof can be determined by selecting the length of the retaining tabs 112. Usually the fastening bolts 34 are desired to extend exactly in the longitudinal module direction M. However, it might also be advantageous, for example for facilitating the assembly on the roof rail, when the bolts 34 are tilted by few degrees vis-à-vis the longitudinal module direction M. Since the inflator 18 usually includes a flat gas outlet area (not shown), tilting by few degrees will not affect the gas outflow and the inflation behavior of the airbag 16.

Since the inflator fixation 114 is closed as described (shown in FIG. 33), now the bracket 118 is pulled over the retaining tabs 112. In the next step, the web 122 is slid through below the second cut part 103 and the hooks of the first fixing elements 126 are inserted through the openings of the second fixing elements 128 (see FIG. 34). The belt portions 120 are now located on the side of the retaining tabs 122 above the main package 48 of the airbag package 14 and safely retain the latter within the holding bag 104. Thus, the airbag package fixation 124 is closed.

The airbag package 14 including the wrapping 20 now can be inserted in the module carrier 22 so as to assemble the airbag module 10 to the vehicle.

When activating the airbag module 10, the weakened zone 108 opens at the bottom 106 of the holding bag 104 so as to let the airbag package 14 get out. The inflator fixation 114, the airbag package fixation 124 as well as the vehicle-tight fixation via the fixing portions 130 remain closed.

In order to better fix the zigzag folding of the neck 54 in the connecting portion 50 while the airbag package 14 is inserted into the wrapping 20, in an alternative process an intermediate cover 140 may be used, as illustrated in FIGS. 39 to 44.

Figure 39:
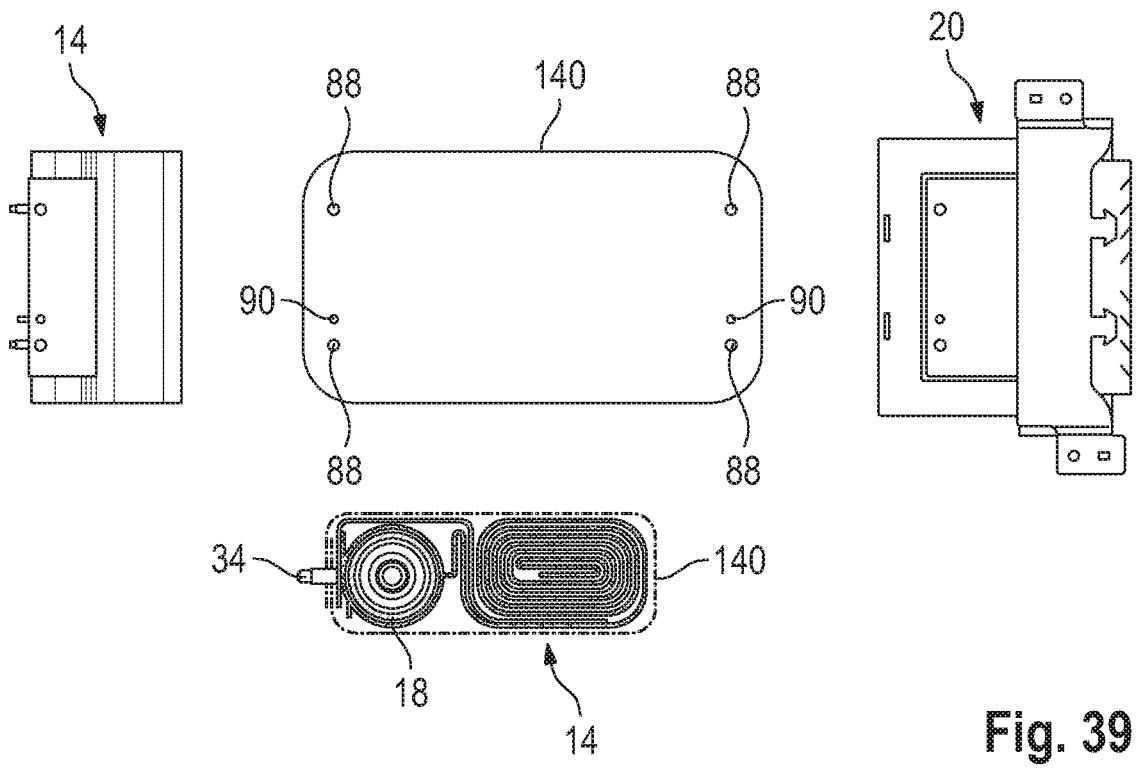
FIG. 39 shows a schematic overview of an alternative process for inserting the airbag package into the wrapping.

The intermediate cover 140 is a substantially rectangular piece of airbag fabric which at both free ends includes a hole pattern corresponding to the fastening bolts 34 and the positioning bolt 42 of the inflator 18 and having two fastening holes 88 and one positioning hole 90 (cf. FIG. 39).

Figure 40:
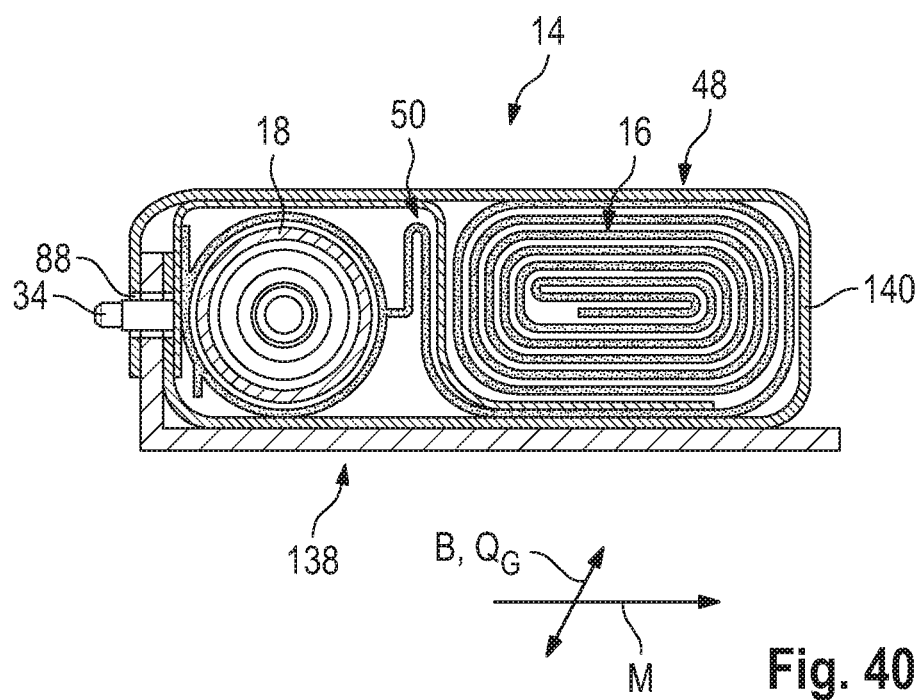
FIGS. 40 to 44 show steps of the alternative process for inserting the airbag package into the wrapping in a representation.

The completely folded airbag package 14 including the inflator 18 is first wrapped into the intermediate cover 140, with both ends of the intermediate cover 140 being pulled over the bolts 34, 42 of the inflator 18. This is shown in FIG. 40, wherein use has been made of a known folding device 136.

Figure 41:
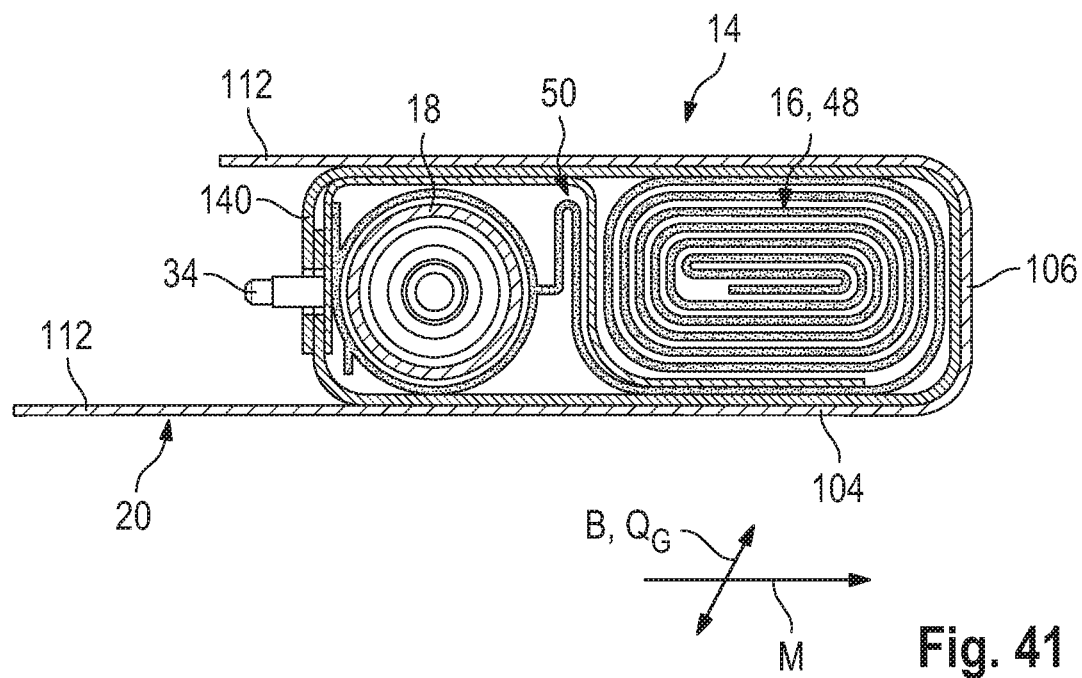

The airbag package 14 tightly enclosed by the intermediate cover 140 now is inserted into the wrapping 20, with the main package 48 being slid into the holding bag 104 (see FIG. 41).

Figure 42:
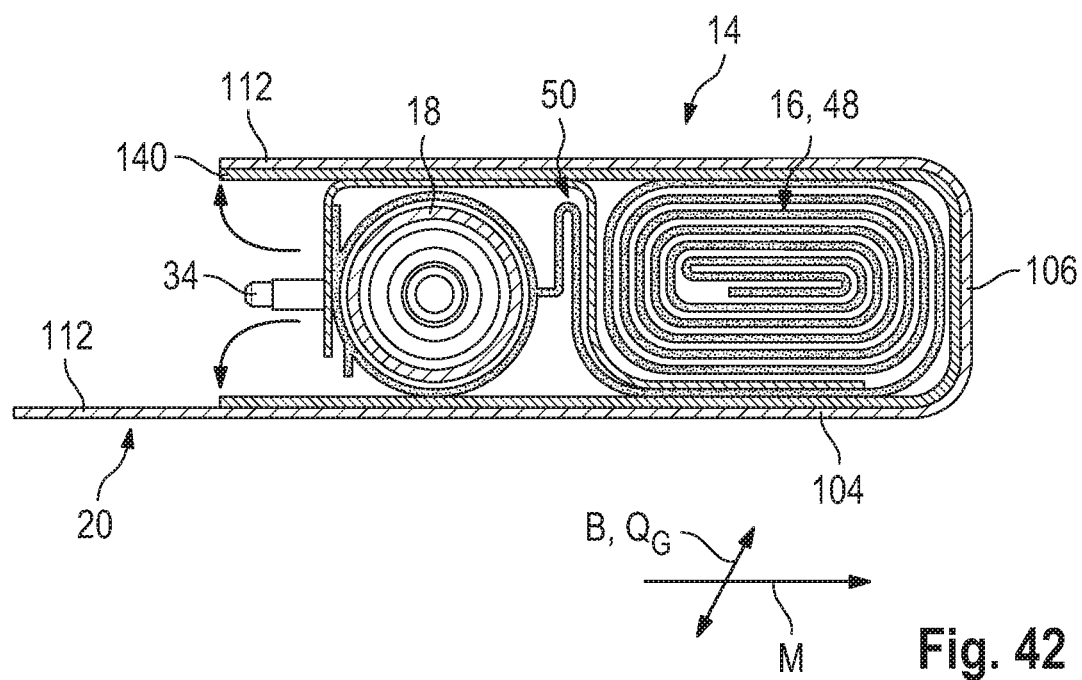

Now the intermediate cover 140 is opened again by the two ends thereof being removed from the bolts 34, 42 of the inflator 18. This is shown in FIG. 42.

Figure 43:
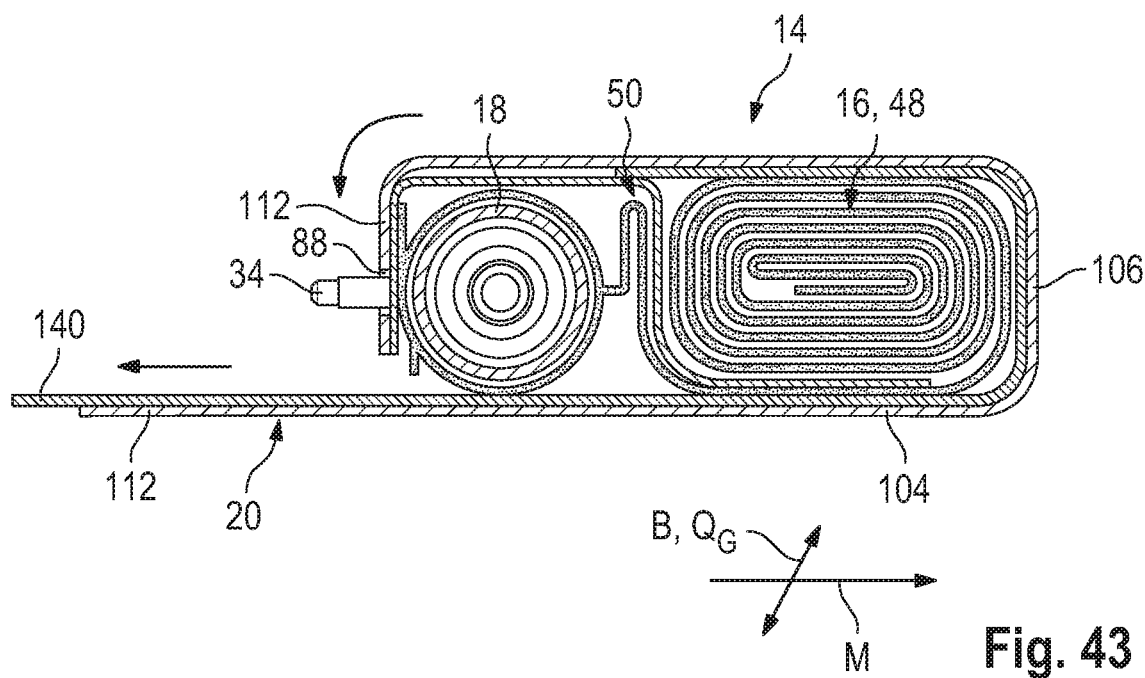
Figure 44:
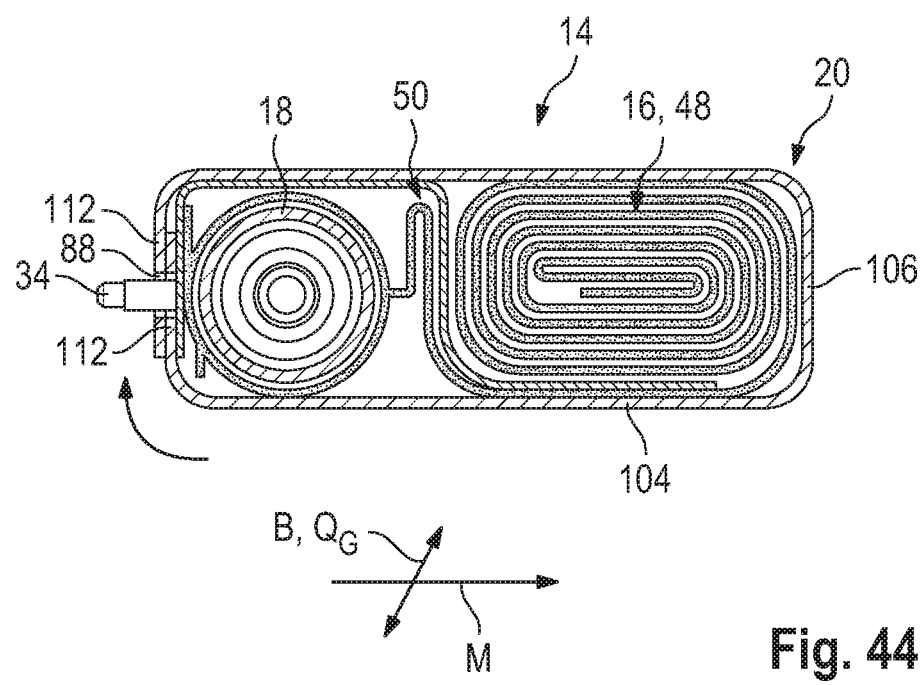

Either of the two retaining tabs 112 of the wrapping 20 is pulled over the bolts 34, 42 of the inflator 18 so as to fix the wrapping 20 to the inflator 18. Now the intermediate cover 140 can be removed from between the airbag package 14 and the wrapping 20, as illustrated in FIG. 43. In so doing, the folding especially of the connecting portion 50 cannot change any more, as the one retaining tab 112 already connected to the inflator 18 maintains the airbag package 14 in its desired shape.

After removing the intermediate cover 140 also the second retaining tab 112 is closed by pulling the holes thereof over the bolts 34, 42 of the inflator 18.

Finally, the airbag package fixation 124 is closed by pulling the bracket 118 over the inflator 18 and the retaining tabs 112 surrounding the latter, by sliding the web 122 beneath the second cut part 103 and by closing the fixing elements 126, 128, as described above.

The invention claimed is:

1. A flexible wrapping for a folded airbag package an airbag of a vehicle occupant restraint system, the wrapping comprising:
   a holding bag comprising a fabric first cut part that is folded over onto itself to form overlying panels, the folded over portion of the first cut part forming a closed bottom of the holding bag, overlying lateral edges of the panels extending from the fold being interconnected to form closed sides of the holding bag defining a holding compartment and a bag opening of the holding bag in fluid communication with the holding compartment, wherein the holding compartment is configured to receive and support the folded airbag package;

an inflator fixation comprising retaining tabs formed by portions of the overlying panels extending away from the opening of the holding bag, the retaining tabs being configured to wrap around an inflator installed in the airbag package and comprising one or more openings configured for installation onto fastening bolts of the inflator, which retains the inflator and the folded airbag package in the holding compartment, with the retaining tabs extending over the bag opening, and an airbag package fixation comprising a portion at least one of the overlying panels extending away from the opening of the holding bag, the airbag package fixation being configured to wrap around the folded airbag package to further retain the folded airbag package in the holding compartment, with the airbag package fixation extending over the airbag opening, the airbag package fixation comprising at least one meshing pair of first and second fabric fixing elements which form a connector pair in the form of a hook and an eye, the hook being configured to extend through the eye and engage the fabric surrounding the eye to retain the hook.

2. The wrapping according to claim 1, wherein the wrapping is completely made from airbag fabric.

3. The wrapping according to claim 1, wherein the airbag bottom comprises a weakened zone configured to rupture in response to airbag inflation and through which the airbag is inflated and deployed.

4. The wrapping according to claim 1, wherein the inflator fixation is configured to support the inflator adjacent the bag opening with the folded airbag package positioned beneath the inflator in the holding compartment.

5. The wrapping according to claim 1, wherein the airbag package fixation comprises belts on opposite sides of the retaining tabs of the inflator fixation and a web that extends laterally between and interconnects the belts.

6. The wrapping according to claim 5, wherein the belts and the web are formed in one of the overlying panels of the first cut part and define a U-shaped bracket formed by a U-shaped intersecting line that separates the bracket from one of the retaining tabs.

7. The wrapping according to claim 1, wherein the airbag package fixation comprises at least one belt portion being maintained in position by the fixing elements and fixing the airbag package within the holding bag for installation in a module carrier configured to be installed in the vehicle.

8. The wrapping according to claim 7, wherein each of the at least one belt portions merges into a corresponding one of the overlying panels of the first cut part at an edge of the bag opening and opposite the bag bottom.

9. The wrapping according to claim 1, further comprising a second cut part connected to the first cut part, wherein the airbag package fixation comprises at least one first fixing element is formed in the second cut part and at least one second fixing element formed in the first cut part.

10. The wrapping according to claim 9, wherein the second cut part further comprises a fixing portion configured to receive a fastener for fastening the wrapping to the vehicle.

11. The wrapping according to claim 10, wherein the fixing portion comprises at least one fastening hole for receiving the fastener and at least one prefixing hole for pre-fixing the wrapping to the vehicle.

12. The wrapping according to claim 10, wherein the wrapping is configured so that, upon inflation and deployment of the airbag, the fixing portion remains fixed on the vehicle.

13. The wrapping according to claim 1, wherein the wrapping in portions consists of plural layers of airbag fabric, wherein edges of the plural layer portions are produced by laser cutting, with the plural layers being welded to each other at the edges.

14. The wrapping according to claim 1, wherein the retaining tabs have different lengths.

15. The wrapping according to claim 1, wherein the wrapping is configured so that, upon inflation and deployment of the airbag, the airbag package fixation and the inflator fixation remain closed.

16. A method of packing an airbag in a wrapping, comprising:

providing a flexible wrapping for a folded airbag package an airbag of a vehicle occupant restraint system, the wrapping comprising:

a holding bag comprising a fabric first cut part that is folded over onto itself to form overlying panels, the folded over portion of the first cut part forming a closed bottom of the holding bag, overlying lateral edges of the panels extending from the fold being interconnected to form closed sides of the holding bag defining a holding compartment and a bag opening of the holding bag in fluid communication with the holding compartment, wherein the holding compartment is configured to receive and support the folded airbag package;

an inflator fixation comprising retaining tabs formed by portions of the overlying panels extending away from the opening of the holding bag, the retaining tabs being configured to wrap around an inflator installed in the airbag package and comprising one or more openings configured for installation onto fastening bolts of the inflator, which retains the inflator and the folded airbag package in the holding compartment, with the retaining tabs extending over the bag opening, and an airbag package fixation comprising a portion at least one of the overlying panels extending away from the opening of the holding bag, the airbag package fixation being configured to wrap around the folded airbag package to further retain the folded airbag package in the holding compartment, with the airbag package fixation extending over the airbag opening;

providing an airbag folded into an airbag package including an inflator and an intermediate cover consisting of a coherent rectangular piece of fabric the length of which corresponds to a total circumference of the airbag package and which at both longitudinal ends includes holes for fastening to the inflator;

wrapping the airbag package along with the inflator into the intermediate cover so that the intermediate cover surrounds the airbag package and the inflator in a longitudinal module direction, and fastening the two longitudinal ends to the inflator;

inserting the assemblage of the intermediate cover, the airbag package, and the inflator into the wrapping so that the airbag package is located in portions within the holding compartment of the holding bag;

opening the intermediate cover by detaching both longitudinal ends of the intermediate cover from the inflator;

fastening one of the retaining tabs of the inflator fixation to the inflator;

removing the intermediate cover from between the airbag package and the wrapping; and fastening the second retaining tab of the inflator fixation to the inflator.

17. The method according to claim 16, comprising the further step of wrapping the airbag package fixation around the airbag package to retain the folded airbag package in the holding compartment, the airbag package fixation extending over the airbag opening and closing the holding bag.

* * * * *